US009073210B2

(12) United States Patent
Nakajima et al.

(10) Patent No.: US 9,073,210 B2
(45) Date of Patent: Jul. 7, 2015

(54) INFORMATION PROCESSING METHOD, APPARATUS, AND COMPUTER READABLE MEDIUM

(71) Applicant: HONDA MOTOR CO., LTD., Tokyo (JP)

(72) Inventors: Ryo Nakajima, Tochigi (JP); Hideari Kamachi, Tochigi (JP); Gentoku Fujii, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/067,068

(22) Filed: Oct. 30, 2013

(65) Prior Publication Data

US 2014/0107840 A1  Apr. 17, 2014

Related U.S. Application Data

(62) Division of application No. 12/913,078, filed on Oct. 27, 2010, now Pat. No. 8,600,552.

(30) Foreign Application Priority Data

Oct. 30, 2009  (JP) ................................. 2009-250612
Oct. 30, 2009  (JP) ................................. 2009-250613

(51) Int. Cl.
  *G05B 19/18*  (2006.01)
  *G06F 19/00*  (2011.01)
  *B25J 9/16*  (2006.01)

(52) U.S. Cl.
  CPC ................. *B25J 9/163* (2013.01); *B25J 9/1697* (2013.01); *G05B 2219/39338* (2013.01); *G05B 2219/39391* (2013.01); *Y10S 901/03* (2013.01)

(58) Field of Classification Search
  CPC combination set(s) only.
  See application file for complete search history.

(56) References Cited

U.S. PATENT DOCUMENTS

| 4,761,596 A | 8/1988 | Nio et al. |
| 4,843,287 A | 6/1989 | Taft |
| 4,862,373 A | 8/1989 | Meng |
| 4,879,663 A | 11/1989 | Fuehrer |
| 4,916,286 A | 4/1990 | Sarugaku et al. |
| 4,942,538 A | 7/1990 | Yuan et al. |
| 4,952,772 A | 8/1990 | Zana |

(Continued)

FOREIGN PATENT DOCUMENTS

| CN | 1738699 | 2/2006 |
| CN | 101521172 | 9/2009 |

(Continued)

*Primary Examiner* — Bhavesh V Amin
(74) *Attorney, Agent, or Firm* — Rankin, Hill & Clark LLP

(57) ABSTRACT

An apparatus executes movement control that causes a robot arm equipped with a camera to move up to an object, thereby enabling a manipulator to move to an object quickly, accurately, and stably as a control system. Specifically, when the object is not detected, the apparatus executes teaching playback control to cause a manipulator to move along a path up to a target position set in advance based on a position of the object. When the object is detected, the apparatus defines a position closer to the object than the target position as a new target position, sets a new path up to the new target position, executes teaching playback control to cause the manipulator to move along the new path until a switching condition for switching the movement control is fulfilled. When the switching condition is fulfilled, the apparatus executes visual servo control.

8 Claims, 13 Drawing Sheets

(56) References Cited

U.S. PATENT DOCUMENTS

| | | |
|---|---|---|
| 4,965,499 A | 10/1990 | Taft et al. |
| 5,321,353 A | 6/1994 | Furness |
| 5,513,299 A | 4/1996 | Terasaki et al. |
| 5,530,791 A | 6/1996 | Okabayashi |
| 5,727,132 A | 3/1998 | Arimatsu et al. |
| 5,748,854 A | 5/1998 | Watanabe et al. |
| 5,877,960 A | 3/1999 | Gross et al. |
| 5,887,122 A | 3/1999 | Terawaki et al. |
| 6,236,896 B1 | 5/2001 | Watanabe et al. |
| 6,278,906 B1 | 8/2001 | Piepmeier et al. |
| 6,328,523 B1 | 12/2001 | Watanabe et al. |
| 7,110,859 B2 | 9/2006 | Shibata et al. |
| 7,130,718 B2 | 10/2006 | Gunnarsson et al. |
| 7,613,545 B2 | 11/2009 | Watanabe et al. |
| 7,817,847 B2 | 10/2010 | Hashimoto et al. |
| 8,121,731 B2 | 2/2012 | Ban et al. |
| 8,204,623 B1 | 6/2012 | Bhattacharyya et al. |
| 8,332,067 B2 | 12/2012 | Ditscher et al. |
| 2004/0138779 A1 | 7/2004 | Shibata et al. |
| 2004/0186627 A1 | 9/2004 | Watanabe et al. |
| 2007/0120512 A1 | 5/2007 | Albu-Schaffer et al. |
| 2007/0145027 A1 | 6/2007 | Izawa et al. |
| 2007/0213873 A1 | 9/2007 | Ban et al. |
| 2011/0270444 A1 | 11/2011 | Nagata et al. |

FOREIGN PATENT DOCUMENTS

| | | |
|---|---|---|
| JP | 08-174457 | 7/1996 |
| JP | 2000-089826 | 3/2000 |
| JP | 2001-246582 | 9/2001 |
| JP | 2003-305676 | 10/2003 |
| JP | 2009-212130 | 9/2009 |
| WO | 2004/052598 A1 | 6/2004 |

INFORMATION PROCESSING METHOD, APPARATUS, AND COMPUTER READABLE MEDIUM

This application is based on and claims the benefit of priority from Japanese Patent Application Nos. 2009-250612 and 2009-250613, respectively filed on 30 Oct. 2009 and 30 Oct. 2009, the contents of which are incorporated herein by reference.

BACKGROUND OF THE INVENTION

1. Field of the Invention

The present invention relates to an information processing method, apparatus, and computer readable medium, and more particularly relates to an information processing method, apparatus, and computer readable medium having stored therein a program capable of moving a manipulator to an object quickly, accurately, and stably as a control system.

2. Related Art

Conventionally, robot arms equipped with a manipulator are arranged in the production lines of automobiles and the like, and perform bolt tightening operations when assembling a work such as an automobile door. Specifically, the robot arm performs operations of selecting a bolt hole on which to perform subsequent bolt tightening from among a plurality of bolt holes formed in a surface of the work as an object, moving up to the object, and inserting and threading a bolt thereinto.

As control to cause the robot arm to move up to the object, teaching playback control that causes the robot arm to move along a path set in advance up to a target position, with a position (hereinafter referred to as "taught position" set in advance based on the position of the object defined as the target position, is widely employed. Teaching playback control indicates open-loop control which teaches beforehand an operation to cause the robot arm to move along a predetermined path set in advance, and causes this operation to be repeated.

However, in actual operation, misalignments in the position or attitude of the work occur attributed to the stopping accuracy of work conveyance on the production line, individual variability of the work pallets for conveying works on the production line, or the like. Due to these misalignments, error arises between the taught position and the actual position of bolt holes.

Consequently, in order to eliminate such error, Japanese Unexamined Patent Application, Publication Nos. H8-174457 and 2001-246582 disclose methods of acquiring the deviation between a position of a tip end of the robot arm and the actual position of the bolt hole, by way of a camera attached to the tip end of the robot arm, and correcting the position of the robot arm based on the deviation. In this position correction, predetermined feedback control using a value based on the deviation as a feedback value, e.g., PID control, is employed.

SUMMARY OF THE INVENTION

However, in a case in which the conventional methods including Japanese Unexamined Patent Application, Publication Nos. H8-174457 and 2001-246582 are applied, the robot arm is required to make a momentary stop after reaching the taught position by way of the teaching playback control and before executing the feedback control for position correction. Thus, a problem is encountered in that this momentary stop of the robot arm requires a long time from the start of the robot arm movement till the end of the position correction.

In view of the above problem, the applicant has developed a method for switching to feedback control for position correction when a viewing device such as a camera visually recognizes an object while the robot arm is moving during the teaching playback control.

Furthermore, the applicant has found that, when applying PID control as the feedback control for the position correction in such a method, unwanted vibration in the robot arm may occur when switching to PID control. As a result, the applicant has discovered that visual impedance control can be employed as suitable feedback control for position correction for such a method. Visual impedance control is control based on a conventional impedance control, and uses a virtual external force derived from output information of a viewing device such as a camera, instead of an external force obtained from actual measurement with conventional impedance control. That is to say, the applicant has developed a control method for switching to the visual impedance control when an object is visually recognized by a viewing device such as a camera, while a robot arm is moving by way of the teaching playback control. Hereinafter, such a control method is referred to as "basic control method"). The applicant has already filed a patent application for the basic control method as Japanese Patent Application No. 2008-310412. It should be noted that, in the specification appended to the application form of Japanese Patent Application No. 2008-310412, the visual impedance control is referred to as "non-contact type impedance control".

Applying the basic control method makes it possible to suppress vibration in the robot arm when switching to the feedback control in the course of the teaching playback control, as well as to shorten the time required for position correction. The basic control method is applicable not only to a bolt tightening operation on an automobile door, but is widely and generally applicable to any operation on a work having a plurality of objects to which the manipulator is required to move.

Presently, however, there is a need to implement a method for moving a robot arm to an object more quickly, accurately, and stably as a control system in comparison with the basic control method.

It is an object of the present invention to provide an information processing method, apparatus, and computer readable medium having stored therein a program for controlling a movement of a manipulator, capable of moving the manipulator to an object much more quickly, accurately, and stably as a control system compared with the basic control method. In accordance with a first aspect of the present invention, there is provided an information processing method performed by an information processing apparatus (e.g., a control device 15 in an embodiment described later) for executing movement control that causes a manipulator (e.g., a multi-joint manipulator 23 constituting a robot arm 11 in the embodiment) to move up to an object(e.g., a bolt hole 21 in the embodiment), the manipulator being provided with a viewing device (e.g., a camera 13 in the embodiment) capable of visually recognizing the object, the method comprising:

a first step (e.g., Step S1 of a bolt tightening process in the embodiment) of, in a case that the object is not visually recognized by the viewing device, executing teaching playback control that causes the manipulator to move along a path up to a target position set in advance based on a position of the object;

a second step (e.g., Steps S3 and S4 of the bolt tightening process in the embodiment) of, in a case that the object is visually recognized by the viewing device, defining a position closer to the object than the target position as a new target position, setting a new path up to the new target position, and executing the teaching playback control that causes the manipulator to move along the new path until a switching condition for switching the movement control is fulfilled; and a third step (e.g., Step S5 of the bolt tightening process in the embodiment) of, in a case that the switching condition is fulfilled, acquiring position information of the object visually recognized by the viewing device, and executing visual servo control that causes the manipulator to move up to the object using the position information as feedback information. In accordance with this present invention, when the object is visually recognized during the first step of executing the teaching playback control, the operation is switched to the second step (described below) of continuously executing the teaching playback control, instead of immediately switching to the third step of executing the visual servo control. The second step includes a step of defining a position closer to the object than the target position as the new target position, setting the new path up to the new target position, and executing the teaching playback control that causes the manipulator to move along the new path until the switching condition for switching the movement control is fulfilled. When the switching condition is fulfilled while the teaching playback control in the second step is executed, the operation is switched to the third step.

This makes it possible to start the visual servo control while keeping a state of the manipulator such as velocity within a certain range. This "certain range" can be easily made a range appropriate for the visual servo control by properly setting the switching condition. In this case, the visual servo control is properly and stably executed. As a result, compared with the case of switching to the visual servo control immediately after the object is visually recognized while the teaching playback control is executed, it becomes possible to move the manipulator much more quickly, accurately, and stably as a control system.

In this case, the second step may include:

a candidate setting step (e.g., Steps S11 to S17 of a modified movement process of a teaching playback control in the embodiment) of setting at least one candidate for the new target position and at least one candidate for the new path;

a path setting step (e.g., Step S18 of the modified movement process of the teaching playback control in the embodiment) of setting the new path based on at least a part of the at least one candidate for the new target position and the at least one candidate for the new path;

a determining step (e.g., Step S20 of the modified movement process of the teaching playback control in the embodiment) of determining whether the switching condition is fulfilled;

a moving step (e.g., Step S19 of the modified movement process of the teaching playback control in the embodiment) of, in a case that the switching condition is not fulfilled, causing the manipulator to move along the new path by way of the teaching playback control; and a switching step (e.g., Step S4 of the bolt tightening process in the embodiment) of, in a case that the switching condition is fulfilled, switching the movement control from the teaching playback control to the visual servo control. In this case, the candidate setting step includes:

an object detecting step (e.g., Step S13 of the modified movement process of the teaching playback control in the embodiment) of detecting a position of the object visually recognized by the viewing device;

a manipulator detecting step (e.g., Step S12 of the modified movement process of the teaching playback control in the embodiment) of detecting a position of the manipulator;

a candidate target position setting step (e.g., Step S14 of the modified movement process of the teaching playback control in the embodiment) of setting one candidate for the new target position based on the position of the object and the position of the manipulator; and a candidate path setting step (e.g., Step S15 of the modified movement process of the teaching playback control in the embodiment) of setting, as one candidate for the new path, a path up to the candidate for the new target position set by way of a process of the candidate target position setting step, wherein the at least one candidate for the new target position and the at least one candidate for the new path are set by executing at least one time a series of processes of the object detecting step to the candidate path setting step. In this case, the switching condition may include a first condition that a velocity of the manipulator is no more than a constant, or a second condition that deviation between the positions of the manipulator and the object is no more than a constant. Here, since the first and the second conditions are independent from each other, only one of them may be employed, or both of them may be employed together combined in combination.

An information processing apparatus (e.g., the control device 15 in the embodiment) and a computer readable medium having stored therein a program (e.g., a program executed by the CPU 101 in the embodiment) according to the first aspect of the invention correspond to the information processing method according to the first aspect of the present invention described above. Therefore, the information processing apparatus and a computer readable medium having stored therein the program according to first aspect of the present invention can have a similar effect as the information processing method according to the first aspect of the present invention described above.

In accordance with a second aspect of the present invention, there is provided an information processing method performed by an information processing apparatus (e.g., the control device 15 in the embodiment) that performs movement control to cause a manipulator (e.g., the multi-joint manipulator 23 constituting the robot arm 11 in the embodiment) to move up to an object (e.g., the bolt hole 21 in the embodiment), the manipulator being provided with a viewing device (e.g., the camera 13 in the embodiment) capable of visually recognizing the object, the information processing method comprising:

a first control step (e.g., Step S1 of the bolt tightening process in the embodiment) of, until a switching condition for switching the movement control is fulfilled, executing teaching playback control that causes the manipulator to move along a path up to a target position set in advance, based on a position of the object; and a second control step (e.g., Step S5 of the bolt tightening process in the embodiment) of, in a case that the switching condition is fulfilled, acquiring position information of the object visually recognized by the viewing device, executing an operation by substituting the position information as feedback information into a control equation including at least one coefficient, and executing visual servo control that causes the manipulator to move up to the object based on a result of the operation, wherein the second control step includes:

a coefficient modifying step (e.g., Steps S32, S33, S36, and S37 of a movement process of a visual impedance control in the embodiment) of modifying at least a part of the at least one coefficient based on a predetermined state of the manipulator. According to the present invention, at least a part of the one or more coefficients included in the control equation of the visual servo control is modified based on the predetermined state of the manipulator. With this, the visual servo control is stably and properly executed regardless of a state of the manipulator such as velocity. This makes it possible to cause the manipulator to move much more quickly, accurately, and stably as a control system compared with the visual servo control in which the one or more coefficients are fixed.

In this case, the visual servo control executed by way of a process of the second controlling step is visual impedance control calculated in accordance with a control equation (e.g., equation (4) in the embodiment) including at least:

a coefficient $F\alpha$, indicative of a virtual external force exerted on the manipulator, variable depending on deviation between the positions of the manipulator and the object; and a coefficient Dd, indicative of a virtual damper exerted on the manipulator, and wherein, as a process of the coefficient modifying step, the information processing apparatus modifies the coefficient Dd based on velocity of the manipulator when the switching condition is fulfilled (e.g., equation (4) in the embodiment). Further in this case, the information processing apparatus as a process of the coefficient modifying step, defines a condition that deviation between the positions of the manipulator and the object have become no more than a predetermined value as a small deviation condition, and, modifies at least one among the coefficient $F\alpha$ and the coefficient Dd when the small deviation condition is fulfilled (e.g., Steps S33 and S37 of the movement process of the visual impedance control in the embodiment). The information processing apparatus may, as a process of the coefficient modifying step, increase the coefficient $F\alpha$ to a value greater than an initial value thereof, when the small deviation condition is fulfilled. The information processing apparatus may, as a process of the coefficient modifying step, increase the coefficient Dd to a value greater than a value modified in a case of the switching condition being fulfilled, when the small deviation condition is fulfilled. Further in this case, the small deviation condition may include a first condition that the velocity of the manipulator is no more than a constant, or a second condition that deviation between the positions of the manipulator and the object is no more than a constant. Here, since the first condition and the second condition are independent from each other, only either of them may be employed or both thereof may be employed together in combination.

An information processing apparatus (e.g., the control device 15 in the embodiment) and a computer readable medium having stored therein a program (e.g., a program executed by the CPU 101 in the embodiment) according to the second aspect of the present invention correspond to the information processing method according to the second aspect of the present invention described above. Therefore, the information processing apparatus and a computer readable medium having stored therein the program according to the second aspect of the present invention can have a similar effect as the information processing method according to the second aspect of the present invention described above.

According to the present invention, it is possible to move a manipulator quickly, accurately, and stably as a control system.

DETAILED DESCRIPTION OF THE INVENTION

An embodiment of the present invention will be explained based on the drawings hereinafter.

Figure 1:
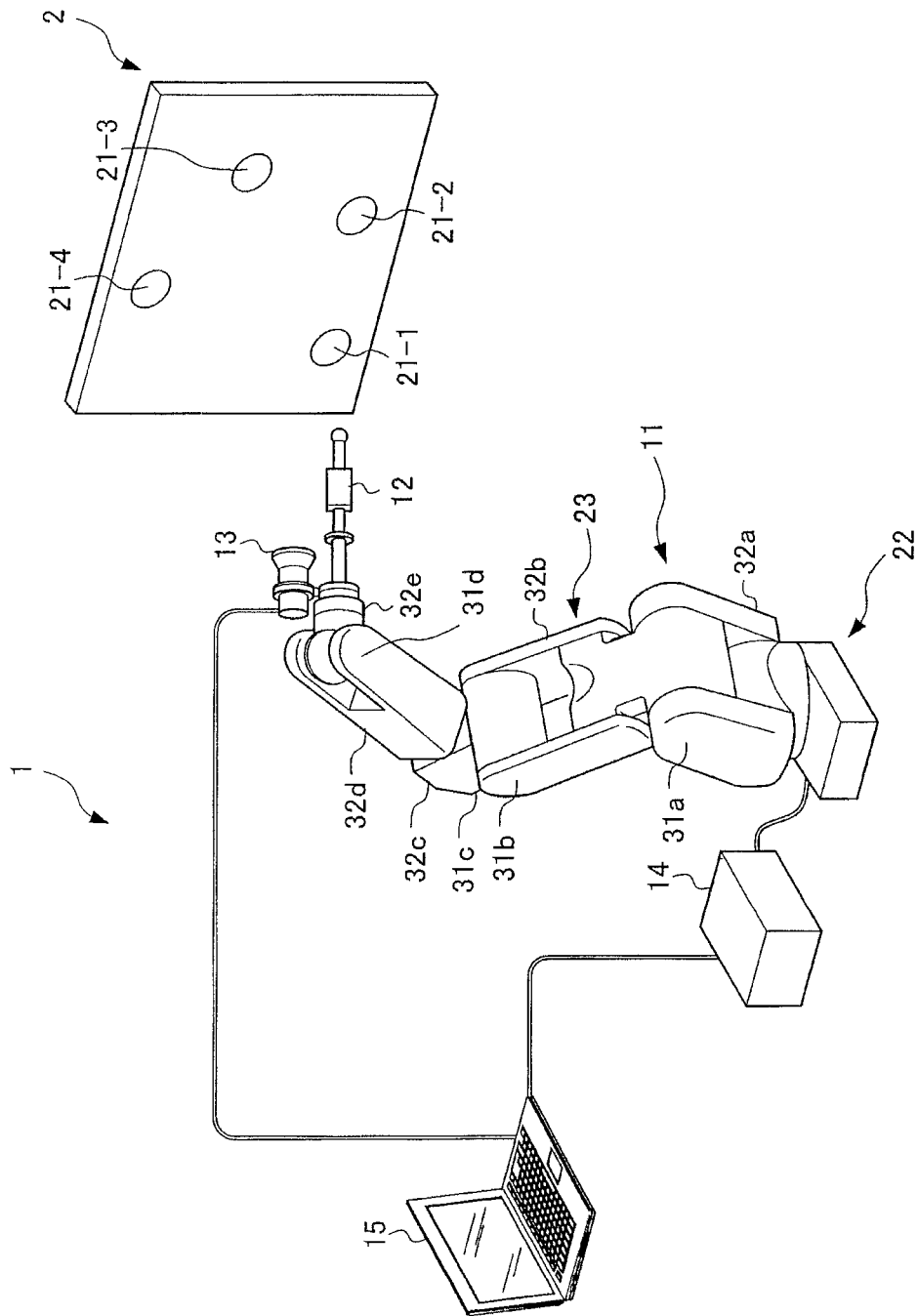
FIG. 1 is a perspective view showing a general external configuration of a robot system according to an embodiment of the present invention.

FIG. 1 is a perspective view showing a general external configuration of the robot system 1 according to an embodiment of the present invention. For example, the robot system 1, is provided in an automobile production line, and performs bolt tightening at the time of assembling a work 2 such as an automobile door. More specifically, there are N bolt holes 21-1 to 21-N (only bolt holes 21-1 to 21-4 are shown in FIG. 1) formed in a surface of the work 2 at N respective predetermined positions defined in advance (hereinafter referred to as "predetermined position"). Here, N is an integer no less than 1, and is an integer no less than 4 in the example shown in FIG. 1. The robot system 1 performs an operation of inserting and threading N bolts into respective bolt holes 21-1 to 21-N. Hereinafter, bolt hole 21-i, i being 1 to N, is referred to simply as "bolt hole 21", if there is no need of distinction.

The robot system 1 is provided with a robot arm 11, an end effector 12, a camera 13, a robot arm driving device 14, and a control device 15.

The robot arm 11 is provided with a robot base 22, and a multi-joint manipulator 23 pivotally mounted to the robot base 22. The multi-joint manipulator 23 is provided with joints 31a to 31d, connecting members 32a to 32e, servo motors (not shown) for rotating the joints 31a to 31d, respectively, detectors (not shown) for detecting various states of the servo motors such as position, velocity, and electrical current. Overall operation of the multi-joint manipulator 23, i.e. overall operation of the robot arm 11, is carried out by combining rotational operations of the joints 31a to 31d by means of the respective servo motors with operations of the connecting members 32a to 32e in response to the respective rotational operations.

The end effector 12 is attached at an end of the connecting member 32e of the multi-joint manipulator 23 and inserts and threads a bolt into the bolt hole 21.

The camera 13 is mounted to be fixed to the periphery of the connecting member 32e of the multi-joint manipulator 23 so that the camera 13 can capture an image of a tip of the end effector 12 at a center of an angle of view. The camera 13 captures images within the angle of view directed to the tip of the end effector 12. Hereinafter, the image captured by the camera 13 is referred to as "captured image". In the present embodiment, a position of the tip of the end effector 12, i.e. a center of the captured image, is employed as a position of the robot arm 11. With this, the position of the robot arm 11 is defined as the center of the captured image. Therefore, the control device 15, which is described later, can easily acquire a relative position of each object contained in the captured image in relation to the position of the robot arm 11, by means of image processing on image data indicative of the captured image.

The control device 15, which is described later, provides the robot arm driving device 14 with a command (hereinafter referred to as "movement command") to move the robot arm 11 up to a target position. Then, in response to the movement command, the robot arm driving device 14, using values detected by the detectors built into the multi-joint manipulator 23 as feedback values, executes torque control, by controlling electric current flowing to the servo motors built into the multi-joint manipulator 23. As a result, the overall operation of the multi-joint manipulator 23, i.e. the overall operation of the robot arm 11, is controlled. During such control, the robot arm driving device 14 successively detects states of the robot arm 11 such as, for example, position and velocity based on the feedback values, and provides the control device 15 with detected results as state information.

Figure 2:
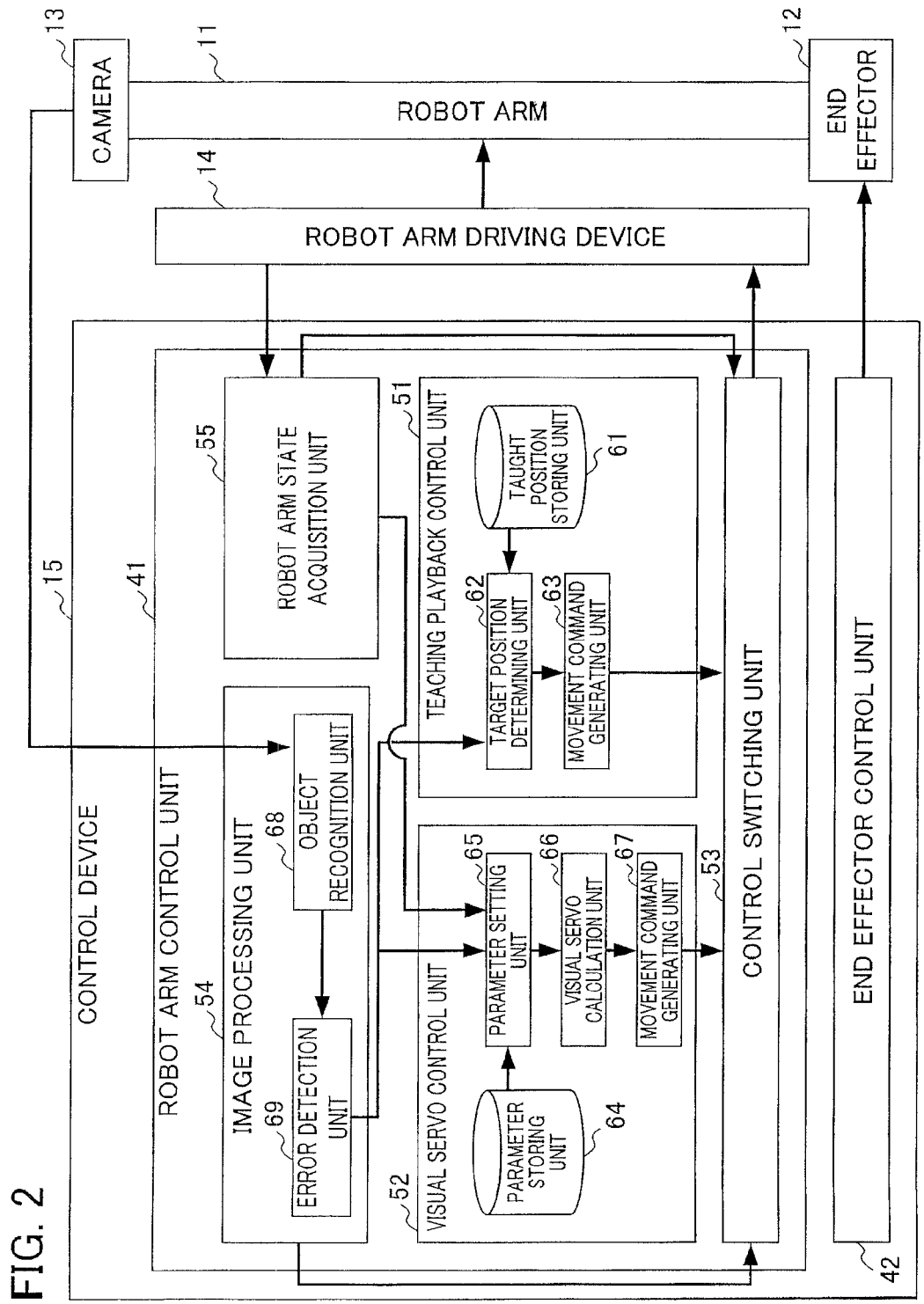
FIG. 2 is a functional block diagram illustrating an example of a functional configuration of a control device of the robot system shown in FIG. 1.

The control device 15 controls the overall operation of the robot system 1. FIG. 2 is a functional block diagram showing an example of a functional configuration of the control device 15.

The control device 15 is provided with a robot arm control unit 41 and an end effector control unit 42. The robot arm control unit 41 controls the movement of the robot arm 11 via the robot arm driving device 14. As a result of the control, the robot arm 11 moves to the bolt hole 21. When the robot arm 11 reaches the bolt hole 21, the end effector control unit 42 controls the end effector 12, whereby the end effector 12 inserts and threads a bolt into the bolt hole 21.

The robot arm control unit 41 is described in detail hereinafter. The robot arm control unit 41 is provided with a teaching playback control unit 51, a visual servo control unit 52, a control switching unit 53, an image processing unit 54 and a robot arm state acquisition unit 55.

The teaching playback control unit 51 executes teaching playback control for causing the robot arm 11 to move along a predetermined path set in advance. The teaching playback control unit 51 is provided with a taught position storing unit 61, a target position determining unit 62, and a movement command generating unit 63. The taught position storing unit 61 stores path information used in the teaching playback control. Specifically, in the teaching playback control, a path formed by connecting one or more taught positions set by teaching in advance in a predetermined order set in advance is used. Therefore, the information regarding the one or more taught positions such as coordinates and the order thereof in the path is stored in the taught position storing unit 61. The target position determining unit 62 recognizes a next taught position from contents stored in the taught position storing unit 61. Based on the next taught position, the target position determining unit 62 determines the next target position, and notifies the movement command generating unit 63. It should be noted that details of a method for determining a target position by the target position determining unit 62 will be described in detail later with reference to the drawings such as FIGS. 3 to 8. Based on the target position notified from the target position determining unit 62, the movement command generating unit 63 generates a movement command, which is provided to the robot arm driving device 14 via the control switching unit 53. Then, as described above, the robot arm driving device 14 moves the robot arm 11 to the target position in accordance with the movement command.

During such movement of the robot arm 11 by way of the teaching playback control to the target position, when a predetermined condition is fulfilled, the control switching unit 53 switches the operation control of the robot arm 11 from the teaching playback control by the teaching playback control unit 51 to a visual servo control by the visual servo control unit 52. It should be noted that specific examples of the predetermined condition to switch the control (hereinafter referred to as "control switching condition") will be described later with reference to FIGS. 7 and 8.

The visual servo control unit 52 generates the movement command by means of predetermined visual servo control using information based on the captured image of the camera 13 as feedback information, and provides the command to the robot arm driving device 14 via the control switching unit 53.

In the present embodiment, visual impedance control is employed as the visual servo control. The visual impedance control indicates non-contact type impedance control developed by the applicant based on conventional impedance control. The applicant has already filed a patent application for the basic control method as Japanese Patent Application No. 2008-310412.

Conventional impedance control indicates, for example, a control of position or force executed by setting mechanical impedances imparted to a robot end effector such as, for example, mass, damper, and spring to desired values. More specifically, impedance control is executed using equation (1) below.

$$Md\frac{d^2}{dt^2}X + Dd\left(\frac{d}{dt}X - \frac{d}{dt}Xd\right) + Kd(X - Xd) = F \quad \text{[Equation 1]}$$

In equation (1), Md, Dd, and Kd are impedance parameters denoting mass, damper, and spring, respectively. X denotes the position of the end effector of the robot, and Xd denotes the target position of the end effector of the robot. F denotes an external force exerted to the end effector of the robot. Conventionally, mass Md, damper Dd, and spring Kd have been determined by software to achieve the desired dynamic characteristics. In the conventional impedance control, the end effector of the robot being held in contact with an object is a prerequisite. Therefore, the external force F is measurable by a sensor mounted on the end effector of the robot, and a value thus measured has been employed as a feedback value. Such conventional impedance control in which contact with an object is a prerequisite is hereinafter referred to as "contact-type impedance control".

On the other hand, the visual impedance control executed by the visual servo control unit 52 is employed to cause the robot arm 11 to move to the bolt hole 21 before performing a bolt tightening operation on the bolt hole 21. In this case, the robot arm 11 moves without physical contact with the work 2 in which the bolt hole 21 is formed. Thus, the visual impedance control is impedance control in which the robot arm 11 not being held in contact with any object is a prerequisite. Therefore, in the specification appended to the application form of Japanese Patent Application No. 2008-310412, the visual impedance control is referred to as "non-contact type impedance control". In the visual impedance control, the external force F is not measurable, so deviation (X−Xd) of a position X of the robot arm 11 from a target position Xd is used as a virtual contact amount of the robot arm 11 to the work 2. Then, a virtual external force F exerted to the end effector 12 is calculated as shown in equation (2).

$$F = f(X - Xd) \quad \text{[Equation 2]}$$

In equation (2), F on the right hand side is a predetermined function with the deviation (X−Xd) as an input parameter. More specifically, in the present embodiment, for example, equation (3) below is employed as equation (2). It should be noted that λ in equation (3) denotes a predetermined constant.

$$F = \lambda(X - Xd) \quad \text{[Equation 3]}$$

When modified by substituting equation (3) into equation (1), the following equation (4) is obtained.

$$\frac{d^2}{dt^2}X = \frac{F\alpha - DdV}{Md} \quad \text{[Equation 4]}$$

Fα in equation (4) is a variable parameter depending on deviation (X−Xd) as shown in equation (5) below, i.e. is a parameter based on the virtual external force F.

$$F\alpha = (\lambda - Kd)(X - Xd) \quad \text{[Equation 5]}$$

According to equation (4), an increase in the parameter Fα gives rise to an increase in the acceleration on the left hand side. This means that Fα functions like an automobile accelerator. Therefore, the parameter Fα is hereinafter referred to as "acceleration amount Fα". On the other hand, the parameter Dd is indicative of a virtual damper as described above, and, according to equation (4), an increase in Dd gives rise to a decrease in the acceleration on the left hand side. This means that Dd functions like an automobile brake. Therefore, the parameter Dd is hereinafter referred to as "brake amount Dd". V denotes the velocity of the robot arm 11. In the present embodiment, velocity V of the robot arm 11 is included in the state information supplied from the robot arm driving device 14 to the control device 15.

As shown in equation (4), the output from the visual impedance control serves as an acceleration of the robot arm 11. This means that the visual impedance control is control carried out in such a manner that a target acceleration is determined so that the robot arm 11 does not vibrate, and the parameters on the right hand side of equation (4) is determined so that the acceleration on the left hand side of equation (4) coincides with the target acceleration. As the parameters on the right hand side of equation (4), values set in advance based on a test may be employed, or values variable in accordance with states of movement of the robot arm 11 moving by way of the visual impedance control may be employed. In the present embodiment, a virtual mass Md is set in advance, while the acceleration amount Fα and the brake amount Dd are variable in accordance with states of the movement of the robot arm 11 moving by way of the visual impedance control. A method of variable setting for the acceleration amount Fα and the brake amount Dd is described later with reference to FIGS. 9 to 13.

In order to execute the visual impedance control, the visual servo control unit 52 is provided with a parameter storing unit 64, a parameter setting unit 65, a visual servo calculation unit 66, and a movement command generating unit 67.

The parameter storing unit 64 stores the right hand side parameters of equation (4) or parameters for deriving them. Specifically, the virtual mass Md on the right hand side of equation (4) is stored in the parameter storing unit 64. In the present embodiment, parameters λ and Kd of equation (5), which is described later, parameters S1 and I1 of equation (6), which is described later, a parameter C1 of equation (7), which is described later, and a parameter C2 of equation (8), which is described later, are stored in the parameter storing unit 64 as the parameters used to derive the acceleration amount Fα or the brake amount Dd on the right hand side of equation (4). The parameter setting unit 65 sets the right hand side parameters of equation (4), employing contents stored in the parameter storing unit 64, deviation (X−Xd) supplied from the image processing unit 54, which is described later, and velocity V supplied from the robot arm state acquisition unit 55, which is described later. A method for setting the acceleration amount Fα and the brake amount Dd is described later with reference to FIGS. 9 to 13. The visual servo calculation unit 66 carries out an operation by substituting the parameters determined by the parameter setting unit 65 into equation (4) and supplies the calculation results to the movement command generating unit 67. The movement command generating unit 67 generates a movement command based on the calculation results supplied by the visual servo calculation unit 66 and supplies the movement command to the robot arm driving device 14 via the control switching unit 53. More specifically, since the calculation result of the visual servo calculation unit 66 is the acceleration on the left hand side of equation (4), the movement command generating unit 67 can generate a movement command as a positioning command by integrating the acceleration, and supplies the movement command to the robot arm driving device 14 via the control switching unit 53. Upon receiving the movement command, the robot arm driving device 14 moves the robot arm 11 toward the bolt hole 21 in accordance with the movement command as described above. When the positions of the robot arm 11 and the bolt hole 21 substantially coincide with each other, the visual impedance control by the visual servo controlling unit 52 stops, and the movement of the robot arm 11 stops. Then, the end effector controlling unit 42 controls the end effector 12 to insert and thread a bolt into the bolt hole 21.

In order to detect the deviation (X−Xd) used for the visual impedance control, the image processing unit 54 is provided with an object recognition unit 68 and an error detection unit 69. The object recognition unit 68 recognizes an object in the captured image based on the image data outputted from the camera 13. In the present embodiment, upon recognizing the bolt hole 21 as an object, the object recognition unit 68 supplies the recognition result and the image data of the captured image to the error detection unit 69. The error detection unit 69 acquires a relative position of the bolt hole 21 contained in the captured image as an object in relation to the position X of the robot arm 11 (the center of the image) by executing image processing on the image data of the captured image. Here, since the actual position of the bolt hole 21 is the target position Xd for the robot arm 11, the acquired relative position is equivalent to the deviation (X−Xd) used in the visual impedance control. The deviation (X−Xd) is supplied as feedback information for the visual impedance control to the visual servo control unit 52, and, if required, is supplied to the control switching unit 53 as one of the control switching conditions.

The robot arm state acquisition unit 55 acquires the state information supplied from the robot arm driving unit 14. For example, the velocity V included in the state information is supplied to the visual servo control unit 52 for use in the visual impedance control, and, if required, is supplied to the control switching unit 53 as one of the control switching conditions.

Figure 3:
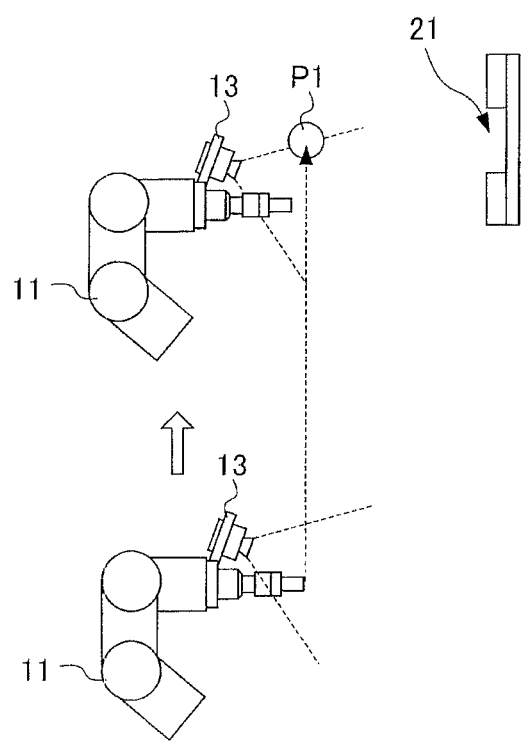
FIG. 3 is a side view for illustrating a problem of the basic control method and shows a general configuration of a robot arm to which the basic control method is applied.
Figure 4:
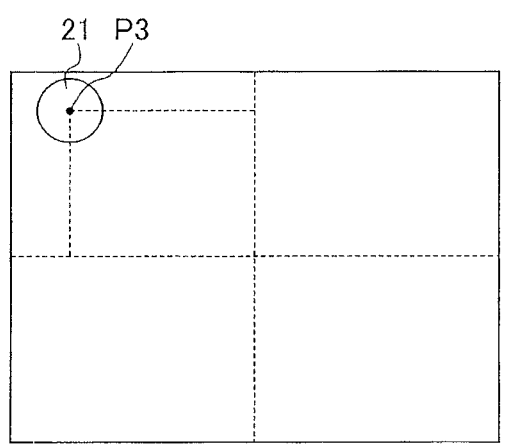
FIG. 4 is a view for illustrating a problem of the basic control method and shows an example of an image captured by a camera mounted to the robot arm to which the basic control method is applied.

An example of the functional configuration of the control device 15 of FIG. 2 has been explained above. Next, problems of the basic control method developed by the applicant and already applied as Japanese Patent Application No. 2008-310412 will be explained described with reference to FIGS. 3 to 8, and then a method that can resolve the problems will be explained. The problems of the basic control method will be explained with reference to FIGS. 3 to 5. For comparison with the robot system 1 shown in FIG. 1, it is herein assumed that a robot system is provided with a control device (hereinafter referred to as "basic control device") to which the basic control method is applied, instead of the control device 15 shown in FIG. 2. As shown in FIG. 3, in the teaching playback control to which the basic control method is applied, the robot arm 11 moves to the taught position P1 set in advance as the target position. During this movement, the camera 13 outputs image data of the captured images in series. When the robot arm 11 is at the position shown in a lower part of FIG. 3, the bolt hole 21 does not appear within the angle of view of the camera 13. Therefore, in this case, the captured image (not shown) does not include the bolt hole 21, and the basic control device does not detect the bolt hole 21. Thereafter, the robot arm 11 moves to the vicinity of the taught position P1, and reaches the position shown in an upper part of FIG. 3, for example. In response to this, the bolt hole 21 appears in the angle of view of the camera 13, and thus, is contained within the captured image as an object, as shown in FIG. 4. In this case, the basic control device recognizes the bolt hole 21 within the captured image and calculates a relative position P3 of the bolt hole 21 in relation to the center of the captured image. Coordinates of the position P3 are expressed in a coordinate system of the angle of view of the camera 13 (hereinafter referred to as "camera coordinate system"). Here, the center of the captured image shown in FIG. 4 corresponds to the position X of the robot arm 11, as described above. In addition, a true target position of the robot arm 11 is not the taught position P1 of the teaching playback control, but rather the position P3 of the bolt hole 21. Therefore, the coordinates of the position P3 in the captured image correspond to the deviation (X−Xd) used by the visual impedance control. Thus, visual impedance control becomes theoretically executable at the time when the bolt hole 21 appears in the captured image, i.e. at the time when the basic control device succeeds in detecting the bolt hole 21.

For this reason, in the basic control method, the condition in which "the bolt hole 21 is detected" has been employed as the control switching condition to switch from the teaching playback control to the visual impedance control.

In conventional control methods such as those disclosed in Patent Documents 1 and 2, the feedback control for correcting positional error (e.g., PID control) is executed when a robot arm makes a momentary stop after teaching playback control ends. On the other hand, in the basic control method, switching to the visual impedance control can be performed while the robot arm 11 is moving by way of the teaching playback control without making a wasteful stop operation as is conventionally.

FIG. 5 is a timing chart showing an example of temporal variation of the velocity V of the robot arm 11 in the case in which the basic control method is applied. In FIG. 5, the horizontal axis represents time, and the vertical axis represents the velocity V of the robot arm. As shown in FIG. 5, in the basic control method, the velocity V of the robot arm 11 under the teaching playback control is constant in an initial stage, but decreases at a predetermined rate after the constant stage.

In this case, due to various factors such as misalignment in position and/or attitude of the work 2, the amount of the misalignment between the taught position P1 of the teaching playback control and the actual position of the bolt hole 21 varies in each case of bolt tightening. Due to such variability, the timing of detection of the bolt hole 21 by the basic control device varies in each case. Therefore, in the basic control method, the timing of switching to the visual impedance control varies in each case. As a result, the velocity V of the robot arm 11 when switching to the visual impedance control varies in each case.

In the visual impedance control of the basic control method, specific states of the velocity V of the robot arm 11 and the like are first assumed, and then, the parameters in equation (4) are determined to be optimal if the assumption is true. Moreover, the response of the visual impedance control is slow compared with the teaching playback control, which is open-loop control. Hence, the basic control method encounters a problem in that the visual impedance control cannot be executed properly, if the assumed velocity is significantly different from the actual velocity V of the robot arm 11 at the time when control is switched to the visual impedance control.

Figure 5A:
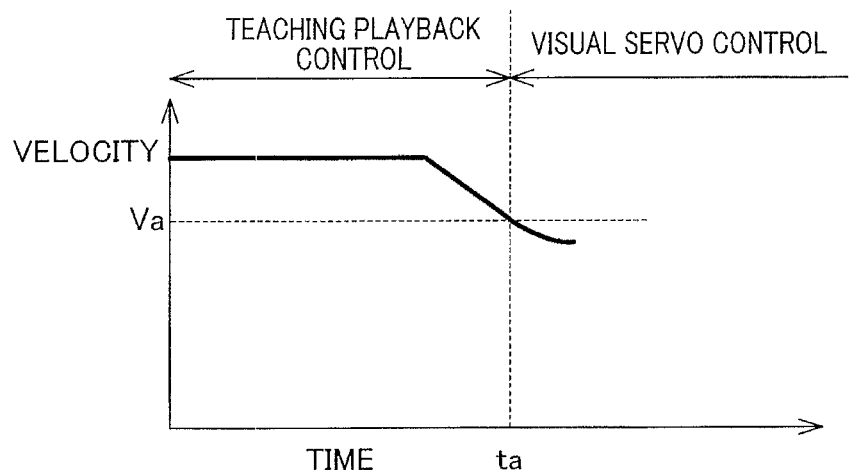
FIG. 5A is a timing chart for illustrating a velocity of the robot arm when a bolt hole is detected at a time earlier than an assumed time.

More specifically, in the example shown in FIG. 5A, the bolt hole 21 is detected at a time to earlier than the assumed time, and then, the control is switched to the visual impedance control (visual servo control) from the teaching playback control. As a result, in the example shown in FIG. 5A, the velocity V of the robot arm 11 takes a high velocity Va higher than the assumed velocity when switched to the visual impedance control. Starting the visual impedance control at a high velocity such as Va indicates starting the control with a slow response while the parameters of equation (4) are improperly set. In such a case, overshoot of position control takes place. Hence, a problem is encountered in that the robot arm 11 keeps moving fast and overshoots the true target position, which is the actual position of the bolt hole 21.

Figure 5B:
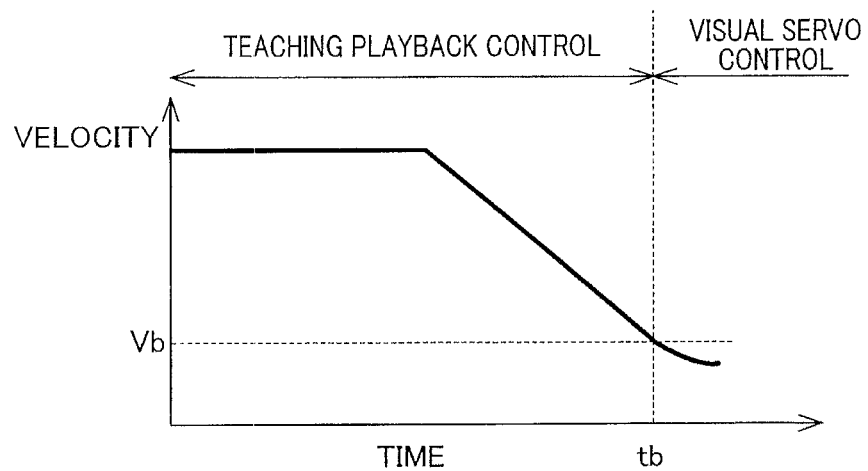
FIG. 5B is a timing chart for illustrating a velocity of the robot arm when a bolt hole is detected at a time later than the assumed time.

On the other hand, in the example shown in FIG. 5B, the bolt hole 21 is detected at a time tb later than the assumed time, and then, the control is switched to the visual impedance control (visual servo control) from the teaching playback control. As a result, in the example shown in FIG. 5B, the velocity V of the robot arm 11 takes a low velocity Vb lower than the assumed velocity when switched to the visual impedance control occurs. Starting the visual impedance control at a low velocity such as Vb indicates starting the control with a slow response while the parameters of equation (4) are improperly set. In such a case, another problem is encountered in that the robot arm 11 keeps moving at a low velocity and it takes a long time to reach the true target position, which is the actual position of the bolt hole 21.

As a method to resolve such problems of the basic control method, a method of narrowing the angle of view of the camera 13 is considered. By narrowing the angle of view of the camera 13, the variation of appearance timing of the bolt hole 21 within the angle of view is limited, and accordingly, the variation of the velocity V of the robot arm 11 when the control is switched to the visual impedance control is limited. However, as a compromise with narrowing the angle of view of the camera 13, it becomes difficult for the camera 13 following the robot arm 11 to capture images of the bolt hole 21, thereby making it impossible to detect the bolt hole 21. Therefore, narrowing the angle of view of the camera 13 cannot really resolve the problem of the basic control method.

Consequently, the applicant invented the following two control methods that can resolve the problems of the basic control method. In the present embodiment, these two control methods are applied to the control device 15 shown in FIG. 2. Therefore, in the following description, the control device 15 shown in FIG. 2 is assumed to constitute a main part of the operation.

Figure 6:
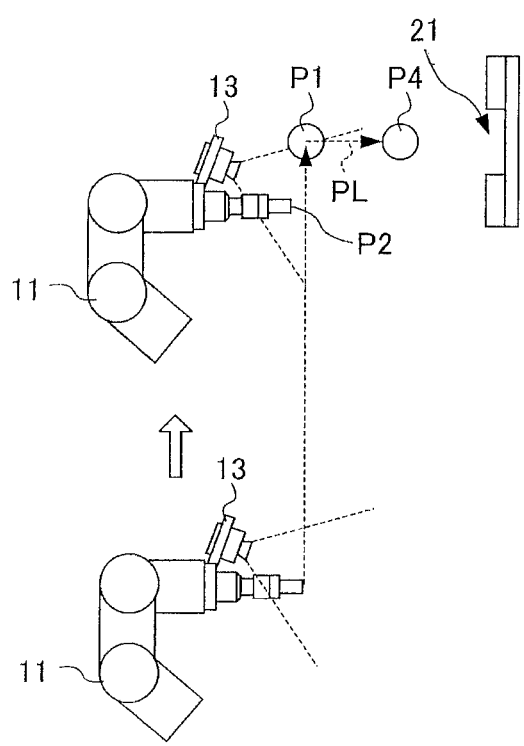
FIG. 6 is a side view for illustrating a three-step movement control method to which the present invention is applied and shows the robot arm of the robot system shown in FIG. 1.
Figure 7:
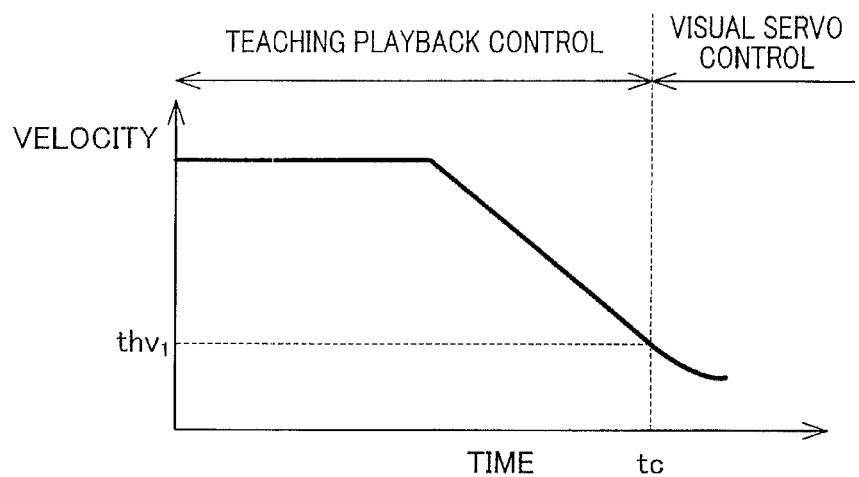
FIG. 7 is a timing chart for illustrating the three-step movement control method to which the present invention is applied and shows an example of temporal variation of velocity of the robot arm of the robot system shown in FIG. 1.
Figure 8:
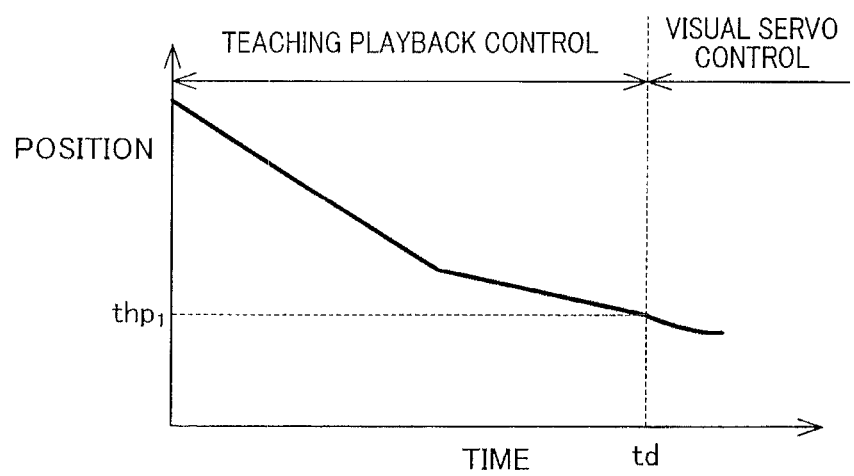
FIG. 8 is a timing chart for illustrating the three-step movement control method to which the present invention is applied and shows an example of temporal variation of deviation between positions of the robot arm of the robot system shown in FIG. 1 and a target position.

FIGS. 6 to 8 are drawings illustrating a first control method according to the present invention. In the first control method, the robot arm 11 initially moves toward the taught position P1 as the target position by way of the teaching playback control. During the movement, the camera 13 outputs the image data of the captured images in series to the control device 15. When the robot arm 11 moves from the position illustrated in a lower part of FIG. 6 to the position illustrated in an upper part thereof, the image processing unit 54 detects a bolt hole 21 from the captured image of the camera 13. The process thus far is the same as the process to which the basic control method is applied. However, in the first control method according to the present invention, when the bolt hole 21 is detected from the captured image of the camera 13, the control is not switched to the visual impedance control unlike the case of the basic control method, but remains under the teaching playback control, and the following processes are executed in series. First, the target position determining unit 62 in the teaching playback control unit 51 changes the target position of the teaching playback control from the taught position P1 to a position P4 closer to the bolt hole 21. Hereinafter, the position P4 is referred to as "virtual target position P4". Next, the movement command generating unit 63 in the teaching playback control unit 51 determines a new path PL from the taught position P1 to the virtual target position P4, generates a movement command according to the new path PL, and supplies the movement command to the robot arm driving device 14 via the control switching unit 53. Then, the robot arm driving device 14 moves the robot arm 11 along the new path PL in accordance with the movement command. When the control switching condition is fulfilled while the robot arm 11 is moving along the new path PL by way of the teaching playback control, the control switching unit 53 switches the operation control of the robot arm 11 from the teaching playback control to the visual impedance control.

Here, as the control switching condition, any condition may be employed so long as the condition can indicate that the robot arm 11 has moved to the vicinity of the bolt hole 21, which is the true target position.

FIG. 7 is a view illustrating an example of the control switching condition. In FIG. 7, a horizontal axis represents time and a vertical axis represents the velocity V of the robot arm 11. For example, a condition that "velocity V of the robot arm 11 becomes no more than the threshold value thv1" can be employed as the control switching condition. Here, a predetermined velocity is defined in advance as the threshold value thv1 as shown in FIG. 7. In this case, the control is always switched to the visual impedance control at the velocity V of the robot arm 11, which is substantially the same as the threshold value thv1. Here, the threshold value thv1 is defined in a range appropriate for the visual impedance control, thereby making it possible for the visual impedance control to be stably and properly executed. Thus, it becomes possible to readily cause the robot arm 11 to move to the bolt hole 21, which is the true target position, much more quickly, accurately, and stably as a control system compared with a case in which the basic control method is applied.

FIG. 8 is a view illustrating another example of the control switching condition, which is different from the example shown in FIG. 7. In FIG. 8, the horizontal axis represents time and the vertical axis represents deviation (X−Xd). For example, a condition that "deviation (X−Xd) becomes no more than the threshold value thp1" can be employed as the control switching condition. Here, a predetermined short distance is defined in advance as the threshold value thp1 as shown in FIG. 8. In this case, the control is always switched to the visual impedance control when the deviation (X−Xd) of the robot arm 11 is substantially the same as the threshold value thp1. Here, the threshold value thp1 is defined in a range appropriate for the visual impedance control, thereby making it possible for the visual impedance control to be stably and properly executed. Thus, it becomes possible to readily cause the robot arm 11 to move to the bolt hole 21, which is the true target position, much more quickly, accurately, and stably as a control system compared with the case in which the basic control method is applied.

Hereinafter, a series of operations performed from the time when the bolt hole 21 is detected in the captured image of the camera 13 until the control is switched to the visual impedance control is referred to as "modified movement process of the teaching playback control". This means that the basic control method includes a first step of moving the robot arm 11 by way of the teaching playback control and a third step of moving the robot arm by way of the visual impedance control. On the other hand, the first control method according to the present invention further includes a second step of executing the modified movement process of the teaching playback control to be carried out between the first and the third steps. Therefore, hereinafter, such a control method is referred to as "three-step movement control method". In the three-step movement control method, since the modified movement process of the teaching playback control is executed before the control is switched to the visual impedance control, it is possible to start the visual impedance control while maintaining states such as the velocity V of the robot arm 11 within a predetermined range without changing the angle of the camera 13. The "predetermined range" can easily be set to a range appropriate for the visual impedance control by properly setting the control switching condition. In this manner, the visual impedance control can be stably and properly executed. As a result, it becomes possible to readily cause the robot arm 11 to move to the bolt hole 21, which is the true target position, much more quickly, accurately, and stably as a control system compared with a case in which the basic control method is applied.

Next, a second control method according to the present invention will be explained. The second control method is a control method in which a step of controlling an operation of the robot arm 11 is executed after the control is switched from the teaching playback control to the visual impedance control. As described above, one of the factors causing the problems of the basic control method is the fact that a state of the robot arm 11 such as the velocity V when the control is switched to the visual impedance control may significantly differ from the state assumed when the various parameters shown in equation (4) of the visual impedance control are determined. Accordingly, in the second control method, the visual servo control unit 52 variably sets the acceleration amount Fα or the brake amount Dd shown in equation (4) of the visual impedance control in response to the states such as the velocity V of the robot arm 11 when and after the control is switched to the visual impedance control. As a result, the visual impedance control is stably and properly executed regardless of the states such as the velocity V of the robot arm 11. Thus, it becomes possible to cause the robot arm 11 to move to the bolt hole 21 much more quickly, accurately, and stably as a control system compared with the case in which the basic control method is applied.

Hereinafter, the second control method according to the present invention is referred to as "variable parameter setting method of the visual impedance control". The variable parameter setting method of the visual impedance control is described hereinafter in detail with reference to FIGS. 9 to 13.

Figure 9:
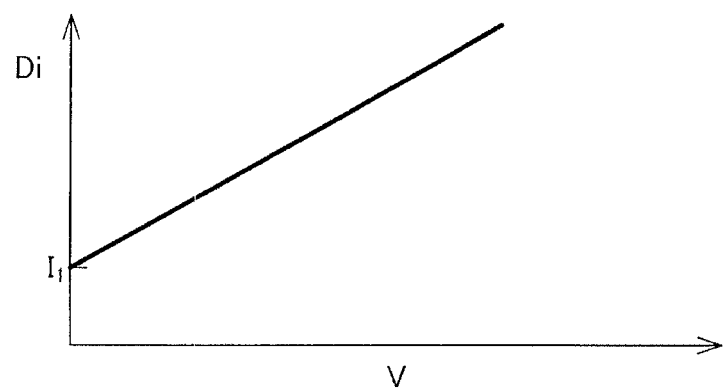
FIG. 9 is a graph for illustrating a variable parameter setting method of a visual impedance control to which the present invention is applied and shows a relationship between an initial brake amount and velocity of the robot arm of the robot system shown in FIG. 1.

FIG. 9 is a graph illustrating the method for setting the brake amount Dd at a time when the control is switched to the visual impedance control. In FIG. 9, the horizontal axis V represents the velocity of the robot arm 11, and the vertical axis Di represents the brake amount at a time when the control is switched to the visual impedance control (hereinafter referred to as "initial brake amount"). As shown in FIG. 9, the initial brake amount Di is set higher, as the velocity V of the robot arm 11 at the time when the control is switched to the visual impedance control becomes higher. More specifically, for example, the initial brake amount Di is calculated as shown in equation (6).

$$Di = V \times S1 + I1 \quad \text{[Equation 6]}$$

In equation (6), each of S1 and I1 denotes a parameter experimentally obtained. In other words, the optimal brake amount Dd for the velocity V of the robot arm 11 is obtained from an experiment, and each of the parameters S1 and I1 are obtained in advance based on this experiment.

At the time when the control is switched to the visual impedance control, it is possible to set the initial brake amount Di calculated in accordance with equation (6) as the brake amount Dd and to substitute Dd into equation (4), thereby making it possible to properly execute the visual impedance control just after switching. This means that the visual impedance control is executed so that acceleration of the visual impedance control is decreased, as the velocity V of the robot arm 11 at the time of switching to visual impedance control is increased. In this way, it is possible to resolve the problem in that the visual impedance control cannot be executed properly, if the variation of the velocity V of the robot arm 11 at the time when the control is switched to the visual impedance control is large.

In addition to the aforementioned problem occurring at the start of the visual impedance control, another problem of the basic control method that arises nearly at the end of the visual impedance control can also be resolved by applying the variable parameter setting method of the visual impedance control.

The basic control method encounters, for example, a problem in that the deviation (X−Xd) decreases as the visual impedance control proceeds and convergence response of positioning becomes slower. As shown in equation (5), in the basic control method, the acceleration amount Fα is proportional to the deviation (X−Xd). Therefore, as the deviation (X−Xd) decreases, the acceleration amount Fα decreases accordingly. As a result, the acceleration of the robot arm 11 decreases. Hence, the problem arises in that the convergence response tends to become slow.

Figure 10:
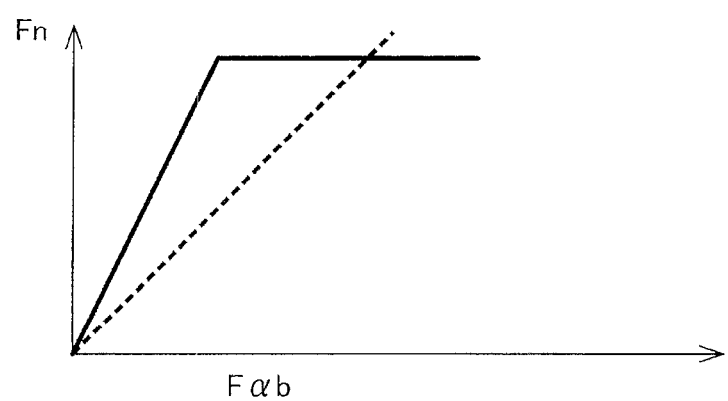
FIG. 10 is a graph for illustrating the variable parameter setting method of the visual impedance control to which the present invention is applied and shows a relationship between an acceleration amount before modification and an acceleration amount after modification.

FIG. 10 is a graph illustrating the method for setting the acceleration amount Fα to resolve the problem described above. In FIG. 10, the horizontal axis represents the acceleration amount Fα calculated in accordance with equation (5), i.e. an acceleration amount before modification Fα. Hereinafter, the acceleration amount Fα calculated by equation (5) is distinctively referred to as "acceleration amount before modification Fαb" following the drawings shown in FIG. 10. The vertical axis of FIG. 10 represents a new acceleration amount after modified Fn. When the deviation (X−Xd) becomes no more than a predetermined value, the new acceleration amount after modification Fn is set higher than the acceleration amount before modification Fαb as shown in FIG. 10. Specifically, for example, the new acceleration amount after modification Fn is calculated as shown in equation (7).

$$Fn = F_{\alpha b} \times C1 \quad \text{[Equation 7]}$$

In equation (7), C1 denotes a parameter experimentally obtained. In other words, the optimal acceleration amount Fα for the deviation (X−Xd) is obtained by an experiment, and the parameter C1 is obtained in advance based on the experiment.

During a time period from the time when the visual impedance control is started until a predetermined condition (hereinafter referred to as "small deviation condition") indicating that the deviation (X−Xd) is no more than a predetermined value is fulfilled, the acceleration amount before modification Fαb calculated in accordance with equation (5) remains used as the acceleration amount Fα. After the small deviation condition is fulfilled, the new acceleration amount after modification Fn calculated in accordance with equation (7) is used as the acceleration amount Fα in equation (4).

Figure 11:
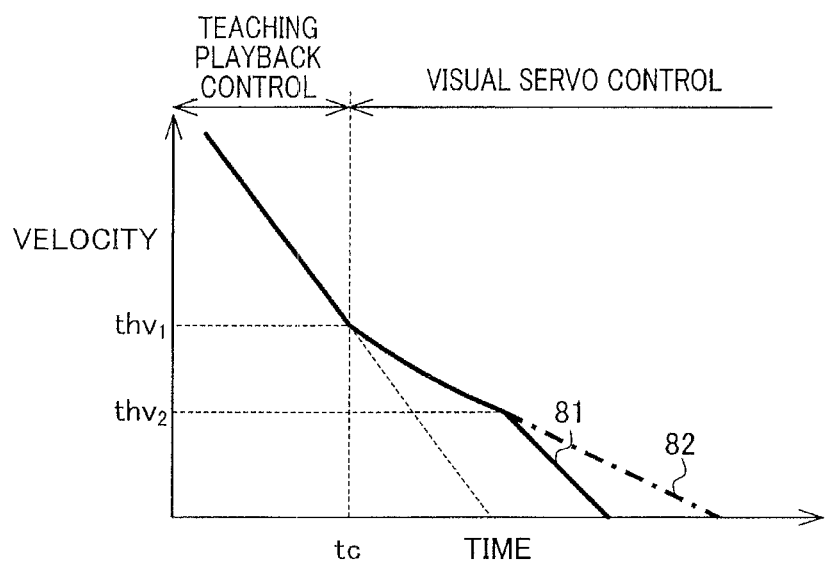
FIG. 11 is a timing chart for illustrating the variable parameter setting method of the visual impedance control to which the present invention is applied and shows an example of temporal variation of velocity of the robot arm of the robot system shown in FIG. 1.

Here, the small deviation condition may be any condition so long as the condition can indicate that the deviation (X−Xd) is no more than a predetermined value. FIG. 11 is a graph illustrating an example of the small deviation condition. In FIG. 11, the horizontal axis represents time, and the vertical axis represents the velocity V of the robot arm 11. For example, as shown in FIG. 11, a condition of "velocity of the robot arm 11 is no more than a threshold value thv2" can be employed as the small deviation condition. Here, the threshold value thv2 is assumed to have been defined in advance as a velocity expected when the deviation (X−Xd) approaches a predetermined short distance. In FIG. 11, the curve 81 indicates a relationship between the velocity V and time in a case in which the acceleration amount before modification Fαb is employed until the aforementioned small deviation condition is fulfilled, and the new acceleration amount after modification Fn is employed after the small deviation condition is fulfilled. On the other hand, the curve 82 indicates a relationship between the velocity V and time in a case in which the acceleration amount before modification Fαb remains employed until the end. By comparing the curves 81 and 82, it is evident that, if the acceleration amount Fα is changed from the acceleration amount before modification Fαb to the new acceleration amount after modification Fn after the small deviation condition is fulfilled, the acceleration of the visual impedance control becomes higher compared with the case in which the acceleration amount before modification is employed. As a result, the visual impedance control can be properly executed after the deviation (X−Xd) becomes no more than a predetermined value, and the convergence response becomes faster.

Figure 12:
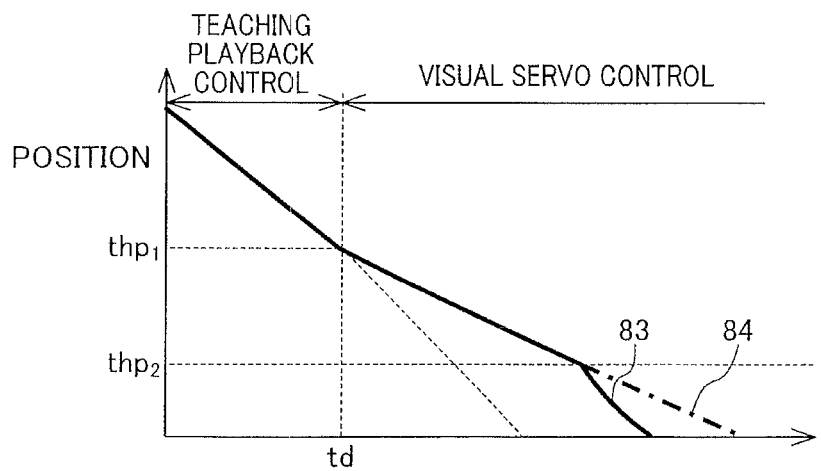
FIG. 12 is a timing chart for illustrating the variable parameter setting method of the visual impedance control to which the present invention is applied and shows an example of temporal variation of a deviation between positions of the robot arm of the robot system shown in FIG. 1 and the target position.

FIG. 12 is a graph illustrating another example of the small deviation condition different from the condition shown in FIG. 11. In FIG. 12, the horizontal axis represents time, and the vertical axis represents deviation (X−Xd). For example, as shown in FIG. 12, a condition of "deviation (X−Xd) is no more than a threshold value thp2" can be employed as the small deviation condition. Here, the threshold value thp2 is assumed to have been defined in advance as a predetermined short distance. In FIG. 12, the curve 83 indicates a relationship between time and deviation (X−Xd) in a case in which the acceleration amount before modification Fαb is employed until the aforementioned small deviation condition is fulfilled, and the new acceleration amount after modification Fn is employed after the small deviation condition is fulfilled. On the other hand, the curve 84 indicates a relationship between time and deviation (X−Xd) in a case in which the acceleration amount before modification Fαb remains employed until the end. By comparing the curves 83 and 84, it is evident that, if the acceleration amount Fα is changed from the acceleration before modification Fαb to the new acceleration after modification Fn after the small deviation condition is fulfilled, the acceleration of the visual impedance control becomes higher compared with the case in which the acceleration amount before modification is employed. As a result, the visual impedance control can be properly executed after the deviation (X−Xd) becomes no more than a predetermined value, and the convergence response becomes faster.

When the small deviation condition thus predetermined is fulfilled, the new acceleration amount after modification Fn, greater than the acceleration amount before modification Fαb, is employed as the acceleration amount Fα in equation (4). As a result, the visual impedance control can be properly executed after the deviation (X−Xd) becomes no more than a predetermined value, and the convergence response becomes faster.

Furthermore, in the basic control method, still another problem arises in that, nearly at the end of the visual impedance control, a moving distance of the robot arm 11 may become unnecessarily large when deviation (X−Xd) becomes small, especially at the very end of positioning where deviation (X−Xd) is close to zero.

Figure 13:
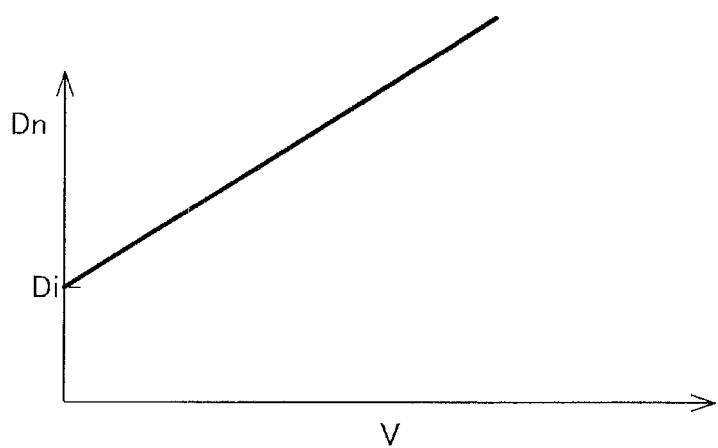
FIG. 13 is a graph for illustrating the variable parameter setting method of the visual impedance control to which the present invention is applied and shows a relationship between a brake amount after modification and velocity of the robot arm of the robot system shown in FIG. 1.

FIG. 13 is a graph illustrating the method for setting the brake amount Dd to resolve the problem described above. In FIG. 13, the horizontal axis represents the velocity V of the robot arm 11, and the vertical axis represents the new brake amount after modification Dn. When the deviation (X−Xd) becomes no more than a predetermined value, as shown in FIG. 13, a value calculated by equation (6) greater than the initial brake amount Di is set as a new brake amount after modification Dn. More specifically, for example, the new brake amount after modification Dn is calculated as shown in equation (8).

$$Dn = Di + (V \times C2) \qquad \text{[Equation 8]}$$

In equation (8), C2 denotes a parameter experimentally obtained. In other words, the optimal brake amount Dd for the velocity V of the robot arm 11 is determined by an experiment, and the parameter C2 is obtained in advance based on the experiment.

During a period from the time when the visual impedance control is started until the deviation (X−Xd) becomes no more than a predetermined value, the initial brake amount Di calculated in accordance with equation (6) is used as the brake amount Dd in equation (4). After the deviation (X−Xd) becomes no more than the predetermined value, the new brake amount after modification Dn calculated in accordance with equation (8) is used as the brake amount Dd in equation (4). As a switching condition from the initial brake amount Di in equation (6) to the new brake amount after modification Dn in equation (8), the small deviation condition is used in the present embodiment without alteration. However, this is only an example, and the switching condition is not required to be limited to the small deviation condition.

Thus, when the deviation (X−Xd) becomes no more than a predetermined value, the new brake amount after modification Dn greater than the initial brake amount Di is used as the brake amount Dd in equation (4). With this, the acceleration of the visual impedance control becomes lower compared with the case in which the acceleration amount before modification is employed. Therefore, it becomes possible to prevent the moving distance of the robot arm 11 from becoming larger than necessary.

As described above, because the three-step movement control method and the variable parameter setting method of the visual impedance control are applied to the control device 15, the various problems of the basic control method can be resolved. In other words, the control device 15 executing the visual impedance control can have such an effect that the robot arm 11 can easily move to the bolt hole 21, which is the true target position, much more quickly, accurately, and stably as a control system, compared with a case in which the basic control method is applied. Here, the three-step movement control method and the variable parameter setting method of the visual impedance control are independent from each other. Therefore, it is not necessary to use them together in combination, and only one of them may be applied, though the effect described above is more prominent when applying them together in combination, as is the case in the present embodiment.

Figure 14:
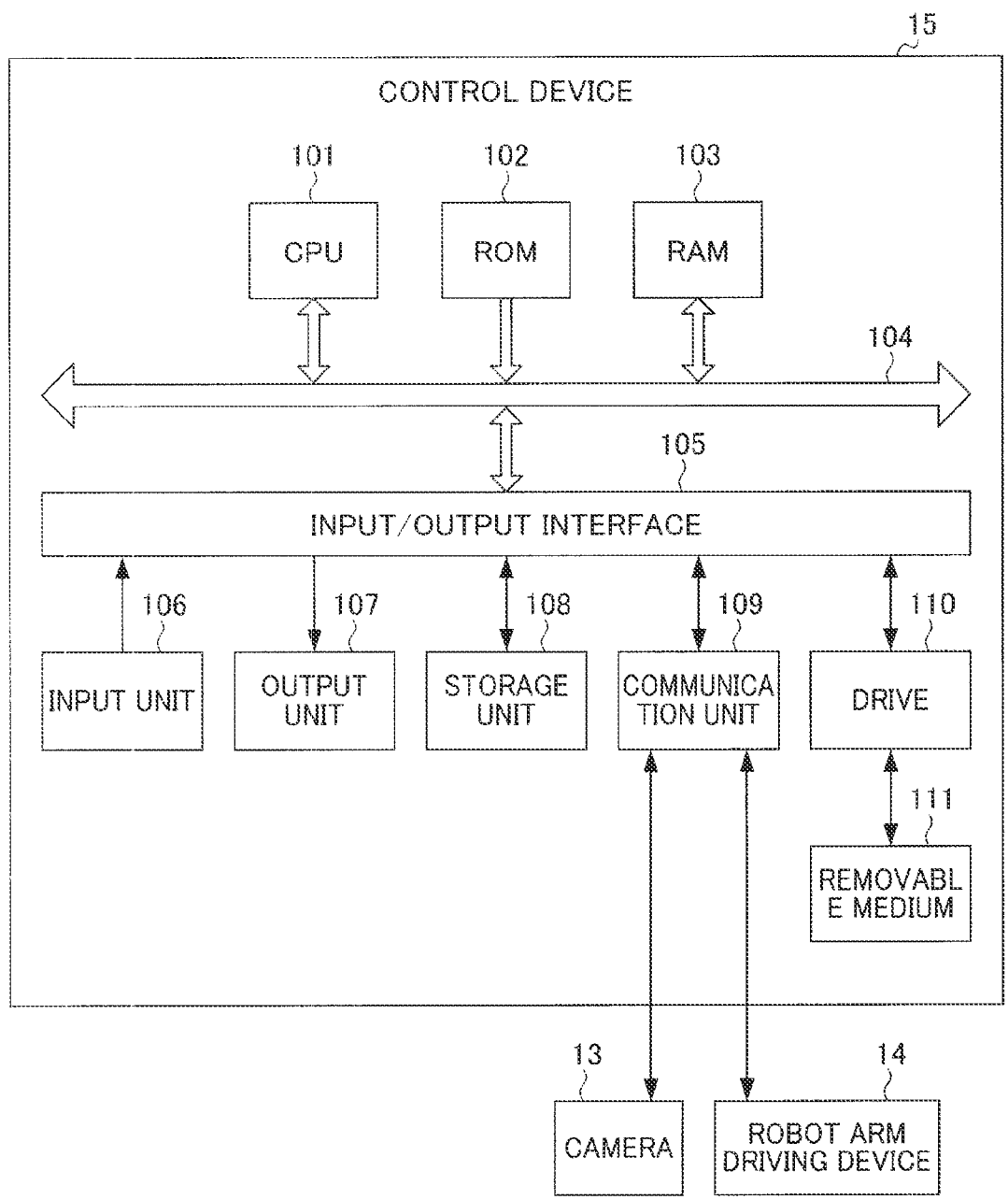
FIG. 14 is a block diagram showing an example of a hardware configuration of the control device shown in FIG. 2.

Next, an example of a hardware configuration of the control device 15 capable of exerting the above effects will be explained. FIG. 14 is a block diagram illustrating an example of a hardware configuration of the control device 15.

The control device 15 is provided with a CPU (Central Processing Unit) 101, ROM (Read Only Memory) 102, RAM (Random Access Memory) 103, a bus 104, an input/output interface 105, an input unit 106, an output unit 107, a storage unit 108, a communication unit 109, and a drive 110.

The CPU 101 executes various processes in accordance with programs that are recorded in the ROM 102. Alternatively, the CPU 101 executes various processes in accordance with programs that are loaded from the storage unit 108 to the RAM 103. The RAM 103 also stores data and the like necessary for the CPU 101 to execute the various processes as appropriate.

For example, in the present embodiment, programs for executing the functions of the robot arm control unit 41 and the end effector control unit 42 shown in FIG. 2 described above are stored either in the ROM 102 or in the storage unit 108. Therefore, each of the functions of the robot arm control unit 41 and the end effector control unit 42 can be realized by the CPU 101 executing the processes according to these programs. Hereinafter, the processes executed according to the programs are referred to as a bolt tightening process. One example of the bolt tightening process is described later with reference to the flowcharts of FIGS. 15 to 17.

The CPU 101, the ROM 102, and the RAM 103 are connected to each other via the bus 104. The bus 104 is also connected with the input/output interface 105.

The input unit 106 constituted by a keyboard and the like, the output unit 107 constituted by a display device, a speaker and the like, the storage unit 108 constituted by a hard disk and the like, and the communication unit 109 are connected to the input/output interface 105. The communication unit 109 respectively controls communication with the camera 13, communication with the robot arm driving device 14, and communication with other devices (not illustrated) via a network including the internet. Although these types of communication are illustrated as wired communication in FIG. 1, wireless communications may also be employed.

The input/output interface 105 is also connected with the drive 110 if necessary, and a removable medium 111 constituted as a magnetic disk, an optical disk, a magnetic optical disk, or semiconductor memory is loaded accordingly. Then, the programs read from these devices are installed in the storage unit 108 if necessary.

Figure 15:
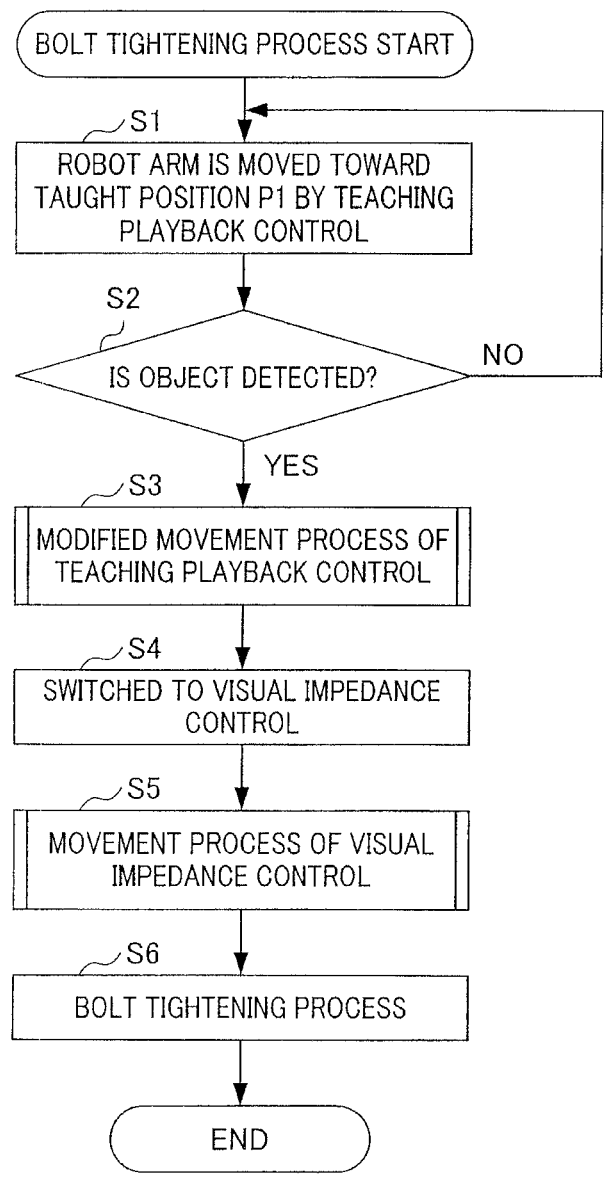
FIG. 15 is a flowchart showing an example of the flow of a bolt tightening process by the control device shown in FIG. 14.

FIG. 15 is a flowchart showing one example of a flow of the bolt tightening process by the control device 15 shown in FIG. 14. FIG. 15 shows a series of processes until bolt tightening is performed on one bolt hole 21. In other words, in the present embodiment, since there are N bolt holes 21-1 to 21-N in the work 2, the bolt tightening process of FIG. 15 is repeatedly performed for each of the N bolt holes 21-1 to 21-N.

In Step S1, the CPU 101 causes the robot arm 11 to move toward the target taught position P1 by teaching playback control. In other words, by means of teaching playback control, the CPU 101 generates a movement command based on the taught position P1 and sends the movement command to the robot arm driving device 14 via the communication unit 109. Then, as described above, the robot arm driving device 14 moves the robot arm 11 toward the taught position P1 according to the movement command.

In Step S2, the CPU 101 determines whether or not an object is detected. Specifically, while the robot arm 11 is moving toward the taught position P1, the camera 13 continuously sends image data of the captured images in series. The CPU 101 receives the image data via the communication unit 109 and determines whether or not the bolt hole 21 is included in the captured image by executing a predetermined image processing. Unless the bolt hole 21 is included in the captured image, it is determined in Step S2 that no object is detected, and the process returns to Step S1 and the processes thereafter are repeated. In other words, until the bolt hole 21 comes to be included in the captured image, a process loop of Steps S1 to S2 being NO is repeated, and the robot arm 11 continuously moving toward the taught position P1 by way of the teaching playback control. When the robot arm 11 comes close to the taught position P1 and the bolt hole 21 appears in the angle of view of the camera 13, the bolt hole 21 is included in the captured image. In this case, the CPU 101 detects the bolt hole 21 as an object. Thus, it is determined to be YES in Step S2 and the process proceeds to Step S3.

In Step S3, the CPU 101 executes the modified movement process of the teaching playback control. In other words, as described above with reference to FIG. 6, the CPU 101 changes the target position of the teaching playback control from the taught position P1 to a virtual target position P4. The CPU 101 defines a new path PL from the taught position P1 toward the virtual target position P4, generates a movement command according to the new path PL, and provides the new path PL to the robot arm driving device 14 via the communication unit 109. Then, the robot arm driving device 14 moves the robot arm 11 along the new path PL according to the movement command. Thereafter, the CPU 101 successively determines whether or not the control switching condition is fulfilled. Until the control switching condition is fulfilled, the robot arm 11 keeps moving along the new path PL by way of the teaching playback control. When the control switching condition is fulfilled, the modified movement process of the teaching playback control ends and the process proceeds to Step S4. An example of the modified movement process of the teaching playback control is described later in further detail with reference to the flowchart shown in FIG. 16.

In Step S4, the CPU 101 switches the movement control of the robot arm 11 from the teaching playback control to the visual impedance control.

In Step S5, the CPU 101 calculates the deviation (X−Xd) based on the image data of the captured image of the camera 13, generates a movement command by way of the visual impedance control employing the deviation (X−Xd) as a feedback amount, and sends the movement command to the robot arm driving device 14 via the communication unit 109. Then, as described above, the robot arm driving device 14 moves the robot arm 11 according to the movement command. Hereinafter, such a process in Step S5 is referred to as "movement process of the visual impedance control". An example of the movement process of the visual impedance control is described later in further detail with reference to the flowchart shown in FIG. 17. When the robot arm 11 comes to the bolt hole 21 and the deviation (X−Xd) becomes approximately zero, it is determined that positioning is complete, the movement process of the visual impedance control ends, and the process proceeds to Step S6.

In Step S6, the CPU 101 controls the bolt tightening process. In other words, the CPU 101 controls the end effector 12 via the communication unit 109 to insert and thread a bolt into the bolt hole 21. With this, the bolt tightening process ends.

Figure 16:
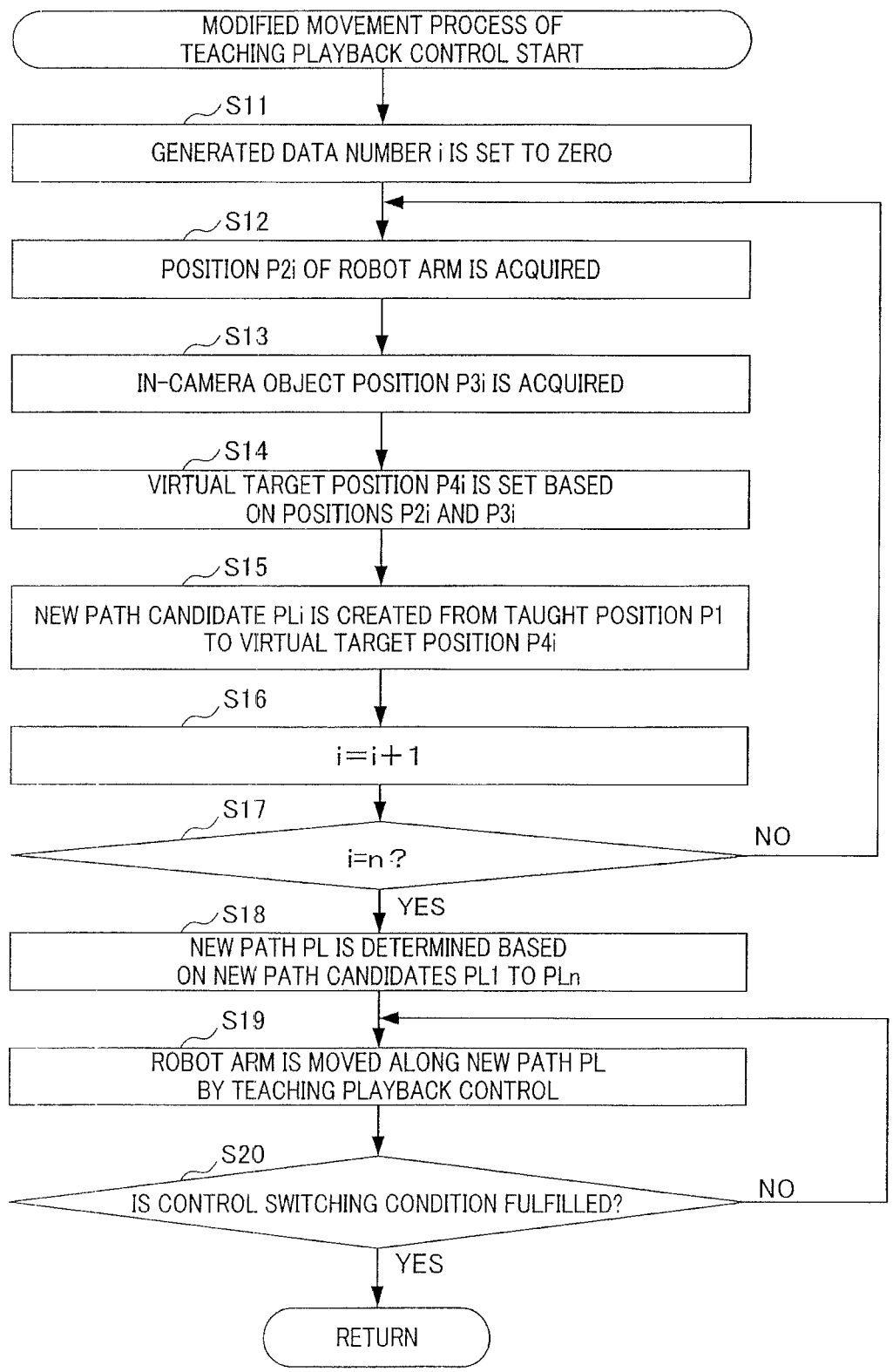
FIG. 16 is a flowchart showing an example of the flow of a modified movement process of teaching playback control in the bolt tightening process shown in FIG. 15.

Next, among the bolt tightening processes, one example of the modified movement process of the teaching playback control in Step S3 is described in further detail. FIG. 16 is a flowchart showing one detailed example of a flow of the modified movement process of the teaching playback control.

As described above, when the bolt hole 21 is detected as an object, it is determined to be YES in Step S2, and the following processes of Steps S11 to S20 are executed as the modified movement process of the teaching playback control.

In Step S11, the CPU 101 sets a data generated number i to zero. The data generated number i denotes a number of data generated to be candidates for a new path PL (hereinafter referred to as "new path candidates"). Here, assuming a necessary number of data for the new path candidates to be n (n being any integer equal to or greater than 1), the data generated number i takes any value between 1 and n.

In Step S12, the CPU 101 acquires a position P2i of the robot arm 11. In the present embodiment, the position P2i of the robot arm 11 denotes coordinates of the tip of the end effector 12 in a coordinate system (hereinafter referred to as "world coordinate system") of the space including the work 2. In the present embodiment, the position P2i of the robot arm 11 is detected by the robot arm driving device 14 and is sent to the control device 15 included in position information. Then, the CPU 101 receives the position information via the communication unit 109 and acquires the position P2i of the robot arm 11 from the position information.

In Step S13, the CPU 101 acquires an in-camera object position P3i. In the present embodiment, the in-camera object position P3i denotes coordinates, in the camera coordinate system, of the bolt hole 21 included as an object in the captured image of the camera 13. The CPU 101 receives the image data of the captured image of the camera 13 via the communication unit 109 and acquires the in-camera object position P3i by executing image processing on the image data as described above.

In Step S14, the CPU 101 defines a virtual target position P4i based on the positions P2i and P3i. In Step S15, the CPU 101 creates a new path candidate PLi from the taught position P1 to the virtual target position P4i. Since another new path candidate PLi is generated, the CPU 101 increments the data generated number i by 1 in Step S16 (i=i+1).

In Step S17, the CPU 101 determines whether or not the number of generated data i has reached the necessary data number n (whether i is n).

When the data generated number i is less than the necessary data number n, it is determined to be NO in Step S17, and the process returns to Step S12, and the processes thereafter are repeated. That is, a process loop of Steps S12 to S17 is repeated to generate n consecutive new path candidates PL1 to PLn. When the n-th new path candidate PLn is generated, the number of generated data i becomes equal to n, it is determined to be YES in the subsequent Step S17 and the process proceeds to Step S18.

In Step S18, the CPU 101 determines the new path PL based on the new path candidates PL1 to PLn. The method of determining the new path PL is not particularly limited, and any method may be applied so long as the method uses at least a part of the new path candidates PL1 to PLn. For example, the CPU 101 may calculate an average of virtual target positions P41 to P4n of the respective new path candidates PL1 to PLn, and create a new path PL from the taught position P1 to the virtual target position P4 by setting the average as the virtual target position P4. In this case, since the virtual target positions P41 to P4n are averaged, errors contained in them can be cancelled out. For another example, the CPU 101 may weight each of the virtual target positions P41 to P4n of the respective new path candidates PL1 to PLn, carry out a predetermined calculation, and create the new path PL from the taught position P1 to the virtual target position P4 by setting the calculation result as the virtual target position P4. Although the weighting method in this case is not limited, it is preferable, for example, to adopt a weighting method of determining a weight depending on the velocity V of the robot arm 11 to cancel out errors included in the virtual target positions P41 to P4n. This is because position data acquired while the robot arm 11 is moving at a low velocity is considered to have a smaller error and to thus be more reliable. In the present embodiment, the velocity V of the robot arm 11 when each of the virtual target positions P41 to P4n is acquired is in the order of highest to lowest (see FIGS. 5 and 7). Therefore, such a weighting method in which a weight for each of the virtual target positions P41 to P4n increases in that order can effectively cancel out the errors included in the virtual target positions P41 to P4n.

Thus, when the new path PL is determined in this way, the process proceeds to Step S19. In Step S19, the CPU 101 causes the robot arm 11 to move along the new path PL by way of the teaching playback control. Specifically, the CPU 101 generates a movement command by way of the teaching playback control based on the new path PL and sends the movement command to the robot arm driving device 14 via the communication unit 109. Then, as described above, the robot arm driving device 14 moves the robot arm 11 along the new path PL according to the movement command.

In Step S20, the CPU 101 determines whether or not the control switching condition is fulfilled. As the control switching condition, for example, either or both of the first condition shown in FIG. 7 and the second condition shown in FIG. 8 can be employed. In the case that a combination of both conditions is employed, either an AND condition or an OR condition may be employed. When the control switching condition is not fulfilled, it is determined to be NO in Step S20, and the process returns to Step S19 and the processes thereafter are repeated. In other words, until the control switching condition is fulfilled, a process loop of Steps S19 to S20 being NO is repeated, whereby the robot arm 11 keeps moving along the new path PL by way of the teaching playback control. When the control switching condition is fulfilled, it is determined to be YES in Step S20, whereby the modified movement process of the teaching playback control ends, and the process proceeds to Step S4 shown in FIG. 15. Specifically, the movement control of the robot arm 11 is switched from the teaching playback control to the visual impedance control, and a movement process of the visual impedance control in Step S5 is executed.

Figure 17:
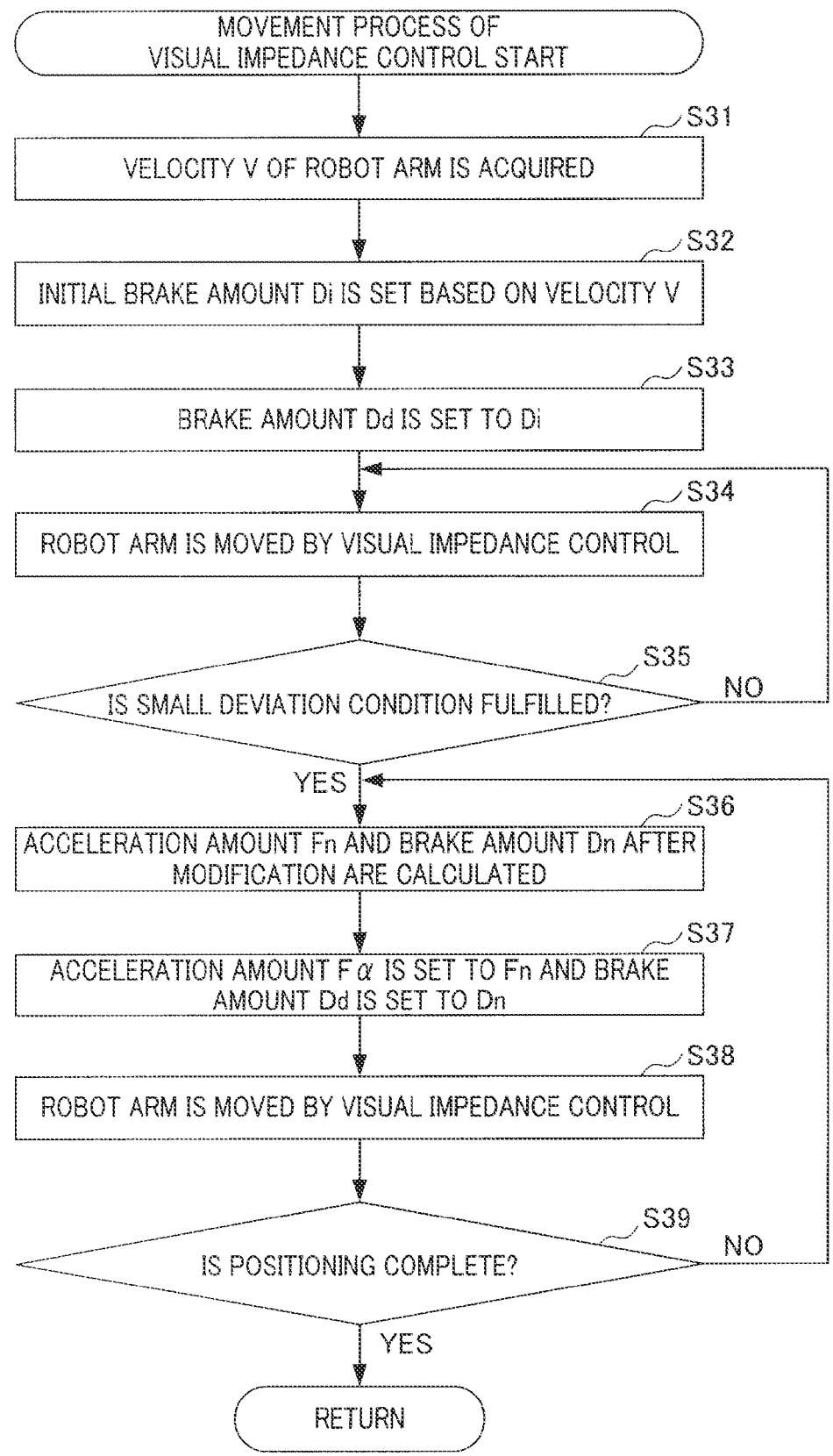
FIG. 17 is a flowchart showing an example of flow of a movement process of a visual impedance control in the bolt tightening process shown in FIG. 15.

Next, an example of the movement process of the visual impedance control in Step S5 is described in further detail. FIG. 17 is a flowchart illustrating a detailed example of a flow of the movement process of the visual impedance control.

In Step S31, the CPU 101 acquires the velocity V of the robot arm 11. In the present embodiment, the velocity V of the robot arm 11 is detected by the robot arm driving device 14 and is sent to the control device 15 included in a state information. Then, the CPU 101 receives the state information via the communication unit 109, and acquires the velocity V of the robot arm 11 out of the state information.

In Step S32, the CPU 101 sets an initial brake amount Di based on the velocity V. In other words, the CPU 101 obtains the initial brake amount Di by substituting the velocity V acquired in the process of Step S31 into equation (6). In Step S33, the CPU 101 sets Di as the brake amount Dd in equation (4).

In Step S34, the CPU 101 causes the robot arm 11 to move by way of the visual impedance control. Specifically, the CPU 101 substitutes the velocity V of the robot arm 11, the acceleration amount F$\alpha$, the brake amount Dd, and the virtual mass Md into equation (4). As described above, the velocity V of the robot arm 11 is included in the state information sent from the robot arm driving device 14. The acceleration amount F$\alpha$b is calculated by substituting a deviation (X−Xd) acquired from the image data of the captured image from the camera 13 into equation (5). The brake amount Dd is set to the initial brake amount Di in the process of Step S33. The virtual mass Md has been determined in advance and recorded in the ROM 102 or the like in advance. The CPU 101 generates a movement command based on a result of equation (4) thus calculated and sends the movement command to the robot arm driving device 14 via the communication unit 109. Then, as described above, the robot arm driving device 14 moves the robot arm 11 according to the movement command.

In Step S35, the CPU 101 determines whether or not the small deviation condition is fulfilled. As the small deviation condition, for example, either one or both of the condition shown in FIG. 11 and the condition shown in FIG. 12 can be employed. When using both in combination, either an AND condition or an OR condition can be employed. When the small deviation condition is not fulfilled, it is determined to be NO in Step S35, and the process returns to Step S34, and the processes thereafter are repeated. In other words, until the small deviation condition is fulfilled, a process loop of Steps S34 to S35 being NO is repeated, whereby the robot arm 11 keeps moving by way of the visual impedance control. Here, with the visual impedance control, the deviation (X−Xd) acquired from the image data of the captured image of the camera 13 is substituted into equation (5), and the acceleration amount Fα is set to the acceleration amount Fαb thus given by equation (5). The brake amount Dd is set to the initial brake amount Di. Thereafter, when the small deviation condition is fulfilled, it is determined to be YES in Step S35, and the process proceeds to Step S36.

In Step S36, the CPU 101 calculates the new acceleration amount after modification Fn according to equation (7) and the new brake amount after modification Dn according to equation (8). In Step S37, the CPU 101 sets the acceleration amount Fα to Fn and the brake amount Dd to Dn.

In Step S38, the CPU 101 moves the robot arm 11 by way of the visual impedance control. Here, with the visual impedance control, the acceleration amount Fα is set to the new acceleration amount after modification Fn, and the brake amount Dd is set to the new brake amount after modification Dn.

In Step S39, the CPU 101 determines whether or not positioning is complete. Although the condition to determine whether or not the positioning is complete is not particularly limited, in the present embodiment, a condition of "the deviation (X−Xd) is approximately zero" is assumed to be employed. Therefore, in the present embodiment, so long as the deviation (X−Xd) is not approximately zero, it is determined to be NO in Step S39, the process returns to Step S36, and the processes thereafter are repeated. In other words, until the deviation (X−Xd) becomes approximately zero, a process loop of Steps S36 to S39 being NO is repeated, whereby the robot arm 11 keeps moving by the visual impedance control. Here, with the visual impedance control, the acceleration amount Fα is set to the new acceleration amount after modification Fn calculated in each process loop of Steps S36 to S39 being NO. The brake amount Dd is set to the new brake amount after modification Dn calculated in each process loop of Steps S36 to S39 being NO. Thereafter, when the deviation (X−Xd) becomes approximately zero, it is determined to be YES in Step S39, the movement process of the visual impedance control ends, and the process proceeds to Step S6 shown in FIG. 15. This means that the end effector 12 inserts and threads a bolt into the bolt hole 21.

According to the present embodiment, the following effects can be obtained.

(1) The control device 15 according to the present embodiment can execute the following processes according to the three-step movement control method. Specifically, when the bolt hole 21, which is the object, is visually recognized during a first step of executing the teaching playback control, the control device 15 switches to a second step instead of immediately switching to a third step of executing the visual impedance control. The second step is a step of defining a position closer to the object than the target position as a new target position, determining a new path to the new target position, and executing the teaching playback control that causes the robot arm 11 to move along the new path until the control switching condition is fulfilled. Then, at the time the control switching condition is fulfilled, the control device 15 switches to the third step. This makes it possible to start the visual impedance control while maintaining a state of the robot arm 11 such as the velocity in a predetermined range. This "predetermined range" can easily be set to a proper range for the visual impedance control by properly defining the control switching condition. In this case, the visual impedance control is stably and properly executed. As a result, it becomes possible to move the robot arm 11 much more quickly, accurately, and stably as a control system compared with the case in which the basic control method is applied.

(2) The control device 15 according to the present embodiment can perform the following processes in accordance with the variable parameter setting method of the visual impedance control. The control device 15 carries out an operation by substituting the deviation (X−Xd) as feedback information into equation (4), which is a control equation including impedance parameters as coefficients, and moves the robot arm 11 to the bolt hole 21 based on the calculation result. In this case, the control device 15 modifies at least one of the acceleration amount Fα and the brake amount Dd, based on a predetermined state of the robot arm 11. With this, the visual impedance control is stably and properly executed regardless of the state of the robot arm 11 such as the velocity V. As a result, it becomes possible to move a manipulator much more quickly, accurately, and stably as a control system compared with a case in which the basic control method is applied.

It should be noted that the present invention is not limited to the present embodiment, and variations, improvements and the like within a scope in which the object of the present invention can be achieved are included in the present invention. For example, in the present embodiment, the three-step movement control method and the variable parameter setting method of the visual impedance control are employed together in combination. However, as described above, these methods may be independent from each other, so it is possible to employ only one of the two methods. In a case in which only the three-step movement control method is employed, e.g., control according to the basic control method can be employed as the visual impedance control in the third step. Moreover, control in the third step is not limited to the visual impedance control, and any kind of visual servo control can be employed. In a case in which only the variable parameter setting method of the visual impedance control is executed, when determined to be YES in Step S2 of FIG. 15, the process of Step S4 is executed without executing the process of Step S4. Then, the process of Step S5, i.e. the movement process of the visual impedance control in FIG. 17, is executed.

Furthermore, a similar method to the variable parameter setting method of the visual impedance control can be applied to any kind of visual servo control other than the visual impedance control. For example, such a method can be applied to visual servo control in which a control device executes an operation by substituting position information of an object visually recognized by a viewing device provided to a manipulator, as feedback information, into a control equation having one or more coefficients, and moves the manipulator to the object based on the calculation results. In this case, the control device can modify at least a part of the one or more coefficients based on a predetermined state of the manipulator. With this, the visual servo control is stably and properly executed irrespective of the state of the manipulator such as the velocity. As a result, in comparison with the case of visual servo control in which the one or more coefficients are determined to be fixed, it becomes possible to move the manipulator much more quickly, accurately, and stably as a control system.

Furthermore, although the manipulator is mounted on the robot arm 11 in the present embodiment, it is not particularly limited thereto, and any kind of manipulator may be used so long as the manipulator can move to an object on an arbitrary work.

Furthermore, in the present embodiment, although the robot arm control unit 41 and the end effector control unit 42 shown in FIG. 2 are configured as a combination of software and hardware (related parts including the CPU 101), this configuration is merely an example, and the present invention is not limited thereto. For example, at least a part of the robot arm control unit 41 and the end effector control unit 42 may be configured as dedicated hardware or may be configured as software.

In this way, the series of processes according to the present invention can be executed by software and also can be executed by hardware.

In a case in which the series of processes is to be executed by software, the program configuring the software is installed via a network or from a storage medium into a computer or the like. The computer may be a computer into which dedicated hardware is incorporated. Alternatively, the computer may be a computer capable of executing various functions by installing various programs, i.e. a general-purpose personal computer, for example.

The storage medium containing the program can be constituted not only by removable media distributed separately from the information processing device (the control device 15 in the present embodiment) main body for supplying the program to a user, but also by a storage medium or the like supplied to the user in a state incorporated in the information processing device main body in advance. The removable media is configured by a magnetic disk (including a floppy disk), an optical disk, a magnetic optical disk, or the like, for example. The optical disk is configured by a CD-ROM (Compact Disk-Read Only Memory), a DVD (Digital Versatile Disk), and the like. The magnetic optical disk is composed of an MD (Mini-Disk) or the like. The storage medium supplied to the user in the state incorporated in the device main body in advance includes the ROM 102 in FIG. 5 storing the program, a hard disk included in the storage unit 108 in FIG. 5, and the like, for example.

It should be noted that, in the present specification, the steps coding a program stored in the storage medium include not only the processes executed in a time series following this order, but also processes executed in parallel or individually, which are not necessarily executed in a time series.

In the present specification, a system denotes of the overall apparatus constituted by a plurality of devices and units.

What is claimed is:

1. An information processing method performed by an information processing apparatus that performs movement control to cause a manipulator to move up to an object, the manipulator being provided with a viewing device capable of visually recognizing the object, the information processing method comprising:
 a first control step of, until a switching condition for switching the movement control is fulfilled, executing teaching playback control that causes the manipulator to move along a path up to a target position set in advance, based on a position of the object; and
 a second control step of, in a case that the switching condition is fulfilled, acquiring position information of the object visually recognized by the viewing device, executing an operation by substituting the position information as feedback information into a control equation including at least one coefficient, and executing visual servo control that causes the manipulator to move up to the object based on a result of the operation, wherein the second control step includes:
 a coefficient modifying step of modifying at least a part of the at least one coefficient based on a predetermined state of the manipulator.

2. An information processing method according to claim 1, wherein
 the visual servo control executed by way of a process of the second controlling step is visual impedance control calculated in accordance with a control equation including at least:
 a coefficient $F\alpha$, indicative of a virtual external force exerted on the manipulator, variable depending on deviation between the positions of the manipulator and the object; and
 a coefficient $Dd$, indicative of a virtual damper exerted on the manipulator, and
 wherein, as a process of the coefficient modifying step, the information processing apparatus modifies the coefficient $Dd$ based on velocity of the manipulator when the switching condition is fulfilled.

3. An information processing method according claim 2, wherein
 the information processing apparatus, as a process of the coefficient modifying step, defines a condition that deviation between the positions of the manipulator and the object have become no more than a predetermined value as a small deviation condition, and modifies at least one among the coefficient $F\alpha$ and the coefficient $Dd$, when the small deviation condition is fulfilled.

4. An information processing method according to claim 3, wherein the information processing apparatus, as a process of the coefficient modifying step, increases the coefficient $F\alpha$ to a value greater than an initial value thereof, when the small deviation condition is fulfilled.

5. An information processing method according to claim 3, wherein the information processing apparatus, as a process of the coefficient modifying step, increases the coefficient $Dd$ to a value greater than a value modified in a case of the switching condition being fulfilled, when the small deviation condition is fulfilled.

6. An information processing method according to claim 3, wherein the small deviation condition includes a condition that the velocity of the manipulator is no more than a constant.

7. An information processing method according to claim 3, wherein the switching condition includes a condition that deviation between the positions of the manipulator and the object is no more than a constant.

8. An information processing apparatus that performs movement control to cause a manipulator to move up to an object, the manipulator being provided with a viewing device capable of visually recognizing the object, the information processing apparatus comprising:
 a first control means for, until a switching condition for switching the movement control is fulfilled, executing teaching playback control that causes the manipulator to move along a path up to a target position set in advance, based on a position of the object;
 a visual processing means for detecting position information of the object based on output information from the viewing device; and
 a second control means for, in a case that the switching condition is fulfilled, executing an operation by substituting the position information detected by the visual processing means as feedback information into a control equation including at least one coefficient, and executing visual servo control that causes the manipulator to move up to the object based on a result of the operation, wherein the second control means includes:
a coefficient modifying means for modifying at least a part of the at least one coefficient based on a predetermined state of the manipulator.

* * * * *